United States Patent [19]

Berni

[11] Patent Number: 5,289,434
[45] Date of Patent: Feb. 22, 1994

[54] RETROREFLECTOR APPARATUS FOR REMOTE SEISMIC SENSING

[75] Inventor: Albert J. Berni, Houston, Tex.

[73] Assignee: Shell Oil Company, Houston, Tex.

[21] Appl. No.: 946,712

[22] Filed: Sep. 18, 1992

[51] Int. Cl.$^5$ ............................................ H04R 21/00
[52] U.S. Cl. ..................................... 367/178; 181/122; 356/345; 356/351; 356/356
[58] Field of Search ............... 356/345, 349, 351, 356; 367/178; 181/122

[56] References Cited

U.S. PATENT DOCUMENTS

| | | |
|---|---|---|
| 3,656,853 | 4/1972 | Bagley et al. . |
| 4,284,350 | 8/1981 | Coon et al. . |
| 4,353,650 | 10/1982 | Sommargren . |
| 4,456,339 | 6/1984 | Sommargren . |
| 4,594,003 | 6/1986 | Sommargren . |
| 4,606,638 | 8/1986 | Sommargren . |
| 4,687,958 | 8/1987 | Sommargren . |
| 4,688,940 | 8/1987 | Sommargren et al. . |
| 4,746,216 | 5/1988 | Sommargren . |
| 4,802,763 | 2/1989 | Young et al. . |
| 4,818,100 | 4/1989 | Breen . |
| 4,834,111 | 5/1989 | Khanna et al. . |
| 4,859,066 | 8/1989 | Sommargren . |
| 4,950,078 | 8/1990 | Sommargren . |
| 5,070,483 | 12/1991 | Berni . |
| 5,109,362 | 4/1991 | Berni . |

FOREIGN PATENT DOCUMENTS

| | | |
|---|---|---|
| WO91/13373 | 9/1991 | PCT Int'l Appl. . |
| 1173772 | 12/1969 | United Kingdom . |
| 1513249 | 6/1978 | United Kingdom . |
| 1605217 | 8/1984 | United Kingdom . |
| 2173064 | 10/1986 | United Kingdom . |
| 2183956 | 6/1987 | United Kingdom . |

Primary Examiner—J. Woodrow Eldred
Attorney, Agent, or Firm—Fred S. Reynolds, Jr.

[57] ABSTRACT

A remote sensing system is provided which operates as a bipolarized, differential mode, LDI (laser differential interferometry) system to detect motion at a remote location. The system is adapted to reduce the effects of turbulence induced frequency fluctuations by using a retroreflector apparatus which converts a single sensing beam into a single return beam having two overlapping transversely polarized sensing signals; thus, turbulence induced noise will be common mode to both return signals and cancel at the receiver. In preferred embodiments, the system is used to detect seismic motions. The retroreflector apparatus is coupled to ground motions at a selected location where it separates the sensing beam into two polarized sensing signals, frequency modulates one of the polarized sensing signals to contain frequency components that represent selected ground motions, and combines the polarized sensing signals into the return beam. The return beam is detected. The return sensing signals are separated from the beam and combined by electronic and/or by optical heterodyning techniques to cancel common mode signals (including turbulence induced noise) on the sensing and return beam, thereby leaving a difference signal which represents the selected ground motions.

In one preferred embodiment, the target is illuminated with a horizontal sensing beam; a polarizing beamsplitter splits the sensing beam into a first and a second polarized sensing signal. The beamsplitter Doppler shifts the first signal and also deflects the first signal to a vertical path where it reflects from an inertially isolated retroreflector. The second signal travels along a horizontal-inline path where it is reflected and Doppler shifted by a seismically coupled retroreflector. The Doppler shifted signals are combined in the beamsplitter to form the return signal. The first signal contains Doppler shifted frequency components which represent vertical and horizontal-inline ground motions. The second return sensing signal contains Doppler shifted frequency components which represent horizontal-inline ground motions. The common mode signals (the horizontal-inline frequency components and turbulence induced noise) are canceled in the receiver, leaving a difference signal which represents vertical motions.

56 Claims, 6 Drawing Sheets

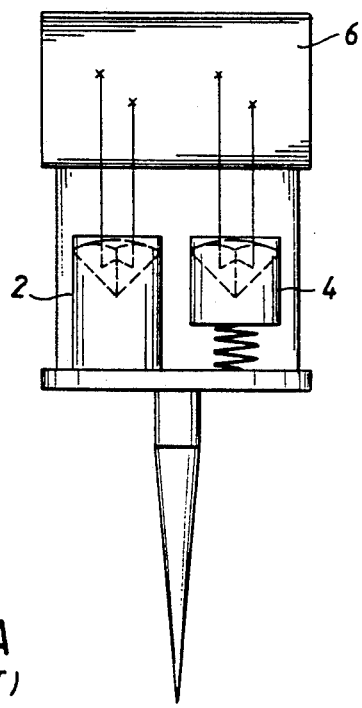
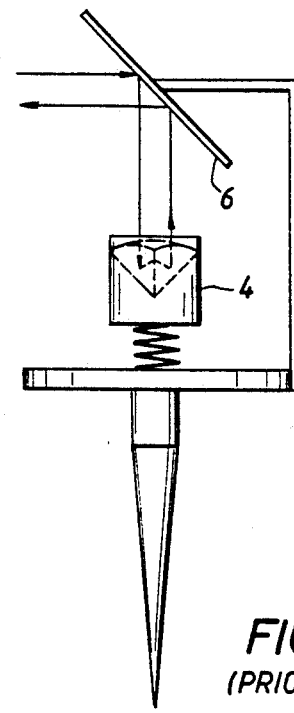
FIG. 1A (PRIOR ART)
FIG. 1B (PRIOR ART)
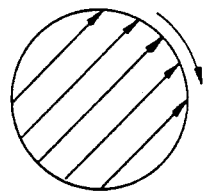
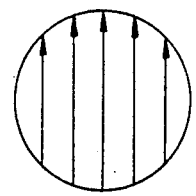
FIG. 2A
FIG. 2B
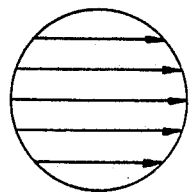
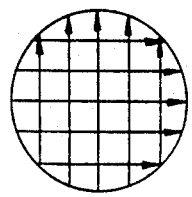
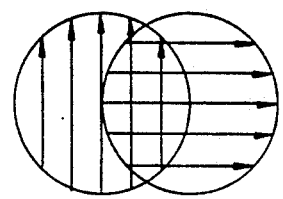
FIG. 2C
FIG. 2D
FIG. 2E

RETROREFLECTOR APPARATUS FOR REMOTE SEISMIC SENSING

FIELD OF THE INVENTION

This invention relates to laser Doppler interferometry techniques used to detect motion, and more particularly, to exploration seismic surveying which uses laser Doppler interferometry techniques to detect seismic signals from motions of the earth.

BACKGROUND OF THE INVENTION

It is generally the objective of seismic exploration to generate seismic energy, make measurements of and record the amplitude of any reflected and refracted energy at selected locations and for selected times, and then by selectively processing the recorded seismic data, to deduce the geometry of the subsurface geologic boundaries as well as some properties of the materials of the earth through which the seismic energy has propagated and from which it has been reflected.

Conventional land seismic acquisition techniques involve the use of an appropriate source (dynamite, vibrator(s), airguns(s), etc.) to generate seismic energy and a set of detectors, spread out on the surface of the earth, to detect any seismic signals due to seismic energy interacting with subsurface geologic boundaries. These detected signals are recorded as a function of time and subsequent processing of these signals, i.e., seismic "traces" or seismic data, is designed to reconstruct an appropriate image of the geologic boundaries of the subsurface and to obtain information about the subsurface materials.

Conventionally, the detector employed to detect seismic signals on land is a geophone. A geophone is an electro-mechanical device that is coupled to the ground via an extension or "spike" that is physically inserted into the ground. This allows the geophone case to vibrate because of any earth motions, including seismic signals. Internal to the geophone case and vibrationally isolated from the case (typically by springs) is an "inertial" mass that does not vibrate with the earth. Thus, there is a small relative motion between the geophone case and its inertial mass due to any detected ground motions. This relative motion is converted to an electrical signal by having a coil of wire that moves through an electromagnetic field of a permanent magnet; the magnet may be the inertial mass with the coil attached to the geophone case, or vice versa. This electrical signal is the seismic signal that is recorded (alone or in combination with other electrical signals) and later processed.

Conventional land seismic data acquisition is slow, expensive and labor intensive. In particular, the activities of installing and then later removing the geophones, which are connected together by cables, is a major factor in the cost and amount of time expended on seismic exploration.

A radar system which senses seismic ground motion (vibrations) remotely is one solution for reducing the cost and time for acquiring seismic data. Two such systems are described in U.S. Pat. Nos. 5,070,483, Remote Seismic Sensing, and 5,109,362, Remote Seismic Sensing. Both patents use laser Doppler heterodyne interferometry techniques to detect the movements of the earth.

Another laser Doppler interferometry system is described in U.S. Pat. No. 4,284,350, Laser Geophone, which uses a homodyne system with a detector that has side-by-side corner-cube retroreflectors for detecting vertical ground motions at a remote location. The use of a single or a side-by-side corner-cube retroreflector arrangement is also suggested for some detectors in embodiments of the systems described in the before mentioned U.S. Pat. Nos. 5,070,483 and 5,109,362.

Simplified illustrations of the prior art Laser Geophone (detector) of U.S. Pat. No. 4,284,350 are provided in FIGS. 1A and 1B. FIG. 1A is a front view showing two side-by-side corner-cube retroreflectors 2, 4. The prior art detector modulates two approximately horizontal laser beams (a first and second sensing beam) which illuminate the detector. The sensing beams are reflected at the detector downward by a mirror 6 onto the side-by-side (first and second) corner-cube retroreflectors 2, 4. The first sensing beam is reflected from the mirror 6 to the first retroreflector 2; the second sensing beam is reflected from the mirror 6 to the second retroreflector 4. The mirror 6 and the first retroreflector 2 are coupled to the motions of the ground, i.e., they are seismically coupled to the motions of the earth; the second retroreflector 4 is inertially isolated from the motions of the ground in the vertical direction.

Each sensing beam is frequency modulated by the detector. When a sensing beam is incident normally on an optical component which reflects (or deflects) the path of the incident sensing beam (such as the mirror 6 or retroreflectors 2, 4), the frequency of the beam may be frequency modulated (Doppler shifted). The amount of Doppler shift at each reflection (deflection) point is proportional to the relative velocity of the reflection point on the Doppler shifting optical component with respect to the incident path of the beam which strikes that point. As the beam is reflected through the detector, the Doppler shifts are cumulative; thus, the Doppler shifts add or subtract from the previous Doppler shifts on the beam. Upon exiting the detector, if the points of reflection on the combination of Doppler shifting optical components have undergone a net relative movement along the incident paths of the sensing beam, the cumulative movement of the reflection points would represent a net velocity with respect to the sensing beam. And, the sensing beam will be Doppler shifted (frequency modulated) by an amount which represents the net velocity of these reflection (deflection) points relative to the incident paths of the sensing beam.

In this specification, an orthogonal coordinate system is used. The terms "vertical" and "horizontal" are used with respect to the motions of the earth at the detector. Vertical defines one ordinate for motions back and forth or up and down along the vertical ordinate. The horizontal is further defined with respect to the path of the transmitted sensing beam to identify a horizontal-inline ordinate and a horizontal-crossline ordinate. A horizontal line, formed by intersecting a vertical plane which extends in the inline direction of a sensing beam with a horizontal plane, defines the horizontal-inline ordinate and the horizontal-inline direction. A horizontal line perpendicular to the horizontal-inline ordinate defines the horizontal-crossline ordinate and horizontal-crossline direction.

Returning to the prior art detector, FIG. 1B shows a side view of the prior art detector of FIG. 1A. Mirror 6 is shown to be at approximately a 45 degree angle with respect to vertical direction and parallel to the horizontal-cross line direction. Since the mirror 6 is coupled to the motions of the ground, the movement of the mirror 6 with respect to the path of both sensing beams imparts a Doppler shift on the sensing beams each time the sensing beams reflect from mirror 6; these Doppler shifts will represent motion in two directions, the relative vertical movement of the mirror and the horizontal-inline movement of the mirror with respect to the incident paths of the beams. Here, no Doppler shift is contributed to the beams for horizontal-cross line movement by the mirror 6 because the mirror is parallel to the horizontal-cross line direction. In the horizontal-crossline direction, the mirror has no relative movement with respect to the incident paths of the beam; thus, these motions do not Doppler shift the beams.

Returning to FIG. 1A, each sensing beam upon initial reflection by the mirror 6 enters the aperture of their respective corner-cube retroreflector 2, 4. A corner-cube (trihedral) retroreflector has the property that any ray entering the effective aperture will be reflected and emerge from the entrance/exit face parallel to itself, but with an opposite direction of propagation. An incident beam, hitting the effective aperture, is reflected exactly back on itself. These properties are, within acceptable angle limits, independent of the orientation of the corner-cube retroreflector. Because the incident beam is reflected within the retroreflector such that the reflected output beam is reflected exactly back on itself, the individual rays of the reflected beam are parallel to their initial position in the incident beam which strikes the retroreflector. This characteristic of the retroreflector is due to the structure of a corner-cube retroreflector; it has three mutually perpendicular reflectors, and each ray entering the retroreflector will reflect from each reflector before exiting.

Each reflector moves in the same direction, but because they face each other, each reflector has a different relative motion with respect to an incident beam striking it from the previous reflector. Since each ray reflects from each mutually perpendicular reflector, the net relative movement for lateral motions on the corner-cube with respect to that ray is zero; thus, the Doppler shifts, placed on each ray for the lateral motions on each reflector as it reflects through the corner-cube, cancel. In this case, the lateral motions on retroreflectors 2, 4 are motions in the horizontal-inline and horizontal-crossline directions.

However, for motions back and forth along the path of the beam from the mirror 6 (here, the vertical direction), the net relative motion is not zero and the beam will be Doppler shifted to reflect this motion.

After each sensing beam is reflected by the retroreflectors 2, 4, they are again reflected (and Doppler shifted), as discussed previously, by the mirror 6. Note that the Doppler shifts imposed on each beam by the mirror are additive. This can be seen by assuming that the mirror is moving upward, the upward motion of the mirror at the 45 degree angle lengthens the path the initial incident beam takes before reflecting from the mirror. The same phenomenon occurs for the incident beam reflected from a retroreflector (the upward motion of the mirror 6 also tends to lengthen the path of the incident beam from the retroreflector); thus, the mirror has a net relative motion in the vertical direction with respect to each beam of FIG. 1A. A similar analysis could be made for mirror motions in the horizontal-inline direction to determine that the mirror 6 has a net relative motion in the horizontal-inline direction.

However, the relative vertical motions of the mirror 6 and retroreflector 2 are in opposite directions with respect to the path of the first sensing beam through the detector of FIG. 1A. This can be seen by noting that when mirror 6 is moving vertically upward, retroreflector 2 also moves in an upward direction. But, the upward motion of retroreflector 2 shortens the incident path of the beam from the mirror; whereas, the upward motion of the mirror lengthens the incident paths of the beams that strike the mirror; thus, the (vertical motion) Doppler shifts imposed on the beam by the retroreflector are opposite to the cumulative Doppler shifts imposed on the beam by the mirror for vertical motions. Since the cumulative vertical Doppler shifts from the mirror 6 are approximately equal to the Doppler shifts from the retroreflector 2, these vertical Doppler shifts cancel. Thus, the frequency modulated first sensing beam of this example contains Doppler shifted frequency components which represent only horizontal-inline ground motions at the Laser Geophone.

The frequency modulated second sensing beam also contains Doppler shifted frequency components because of the motions of mirror 6. However, these frequency components represent vertical ground motions as well as horizontal-inline ground motions. This is because, the inertially isolated retroreflector 4 only acted to reflect the beam; it had no motion in the vertical direction; thus, it did not add to or cancel any Doppler shifted frequency components on the second sensing beam.

In theory, this type of side-by-side retroreflector detector provides Doppler shifted frequency components on the two modulated sensing beams which are approximately identical (common mode signals). Here, the common mode signals represent the horizontal-inline motions on the detector. In addition, this prior art configuration also provides frequency components which are not common to the two beams. In this particular case (the Laser Geophone system), when the modulated beams are combined by optical homodyning, the common mode signals cancel each other and a difference signal (the frequency components which are not common to both beams) remains. One problem with a homodyning system is that it is not possible to determine "up" Doppler and "down" Doppler motion from the obtained difference signal. This problem is resolved by using a heterodyning system instead. However, in spite of this problem, the difference signal provided by this prior art homodyning system does represent the vertical motions of the earth at the remote location.

A side-by-side corner-cube retroreflector configuration is also suggested, as mentioned, for some embodiments of the prior art heterodyning system of previously mentioned U.S. Pat. Nos. 5,070,483 and 5,109,362. However, the configurations taught in these patents do not deflect or reflect a sensing beam onto retroreflectors.

The side-by-side corner-cube retroreflector configurations of the before mentioned designs, or any other type of side-by-side retroreflector design, necessarily require that two sensing beams travel different paths through the air to and from the retroreflectors. Separate air paths may have different effects upon the propagating laser sensing beams. Solar radiation heats the ground surface, causing convective air currents which break into turbulent flow. These randomly sized (roughly 1 millimeter to 1 meter) air packets have anomalous temperatures and refractive indices. The optical phase of each laser beam shifts as it passes through a region of anomalous refractive index. These air packets blow across the raypath and cause time-varying, random frequency modulation of the laser beam. Thus, two laser beams traveling through different air spaces will experience different fluctuations in each carrier frequency of the laser beams.

Since, the two laser beams are spatially separated, they will not be affected equally by the atmosphere and the atmospheric effects on the beams are not totally common mode signals. The atmospheric effects do not cancel completely when the two laser beams are combined by optical heterodyning or by electronic heterodyning when the beams are converted to electrical signals. Thus, the difference signal will not only contain the desired Doppler signal but also an additional component which will be referred to herein as turbulent noise. Turbulent noise is especially prevalent on sunny, windy days. Consequently, if side by side retroreflectors are used as parts of the detector in a remote seismic sensing system, the presence of turbulent noise on the difference signal could prevent an accurate determination of the desired (or selected) ground motions (the desired Doppler signal).

In addition, the prior art configurations of side by side corner-cube retroreflectors are only able to provide a difference signal for vertical motions of the earth at the remote location. They are unable to provide a difference signal which represents horizontal-inline or horizontal-crossline motions of the earth.

SUMMARY OF THE INVENTION

An object of this invention is to provide a remote sensing system which is adapted to reduce turbulent noise on a sensing beam and a return beam.

Another object of this invention is to provide a bipolarized, differential mode, LDI remote sensing system which transmits a single sensing beam to illuminate a target (a retroreflector apparatus) that is coupled to motions at a selected location, and receives from the target a single return beam having two polarized return sensing signals, one of the return sensing signals having frequency components which represent selected motions from the motions coupled to the target.

An additional object of this invention is to provide a target (a retroreflector apparatus) which is functional to be coupled to motions at a remote location, to separate the sensing beam into two sensing signals, to frequency modulate at least one of the two sensing signals by Doppler shifting the signal to contain frequency components representing selected ground motions, and to combine the two sensing signals to form a return beam having two polarized return sensing signals.

A further object of this invention is to provide the target with the ability to align the two polarized return signals on the return beam such that the polarities of the signals are transverse to each other and the two signals overlap such that they share substantially the same air space on the return beam.

Another object of this invention is to provide the target with the ability to frequency modulate either or both of the two sensing signals in such a manner that the return beam will contain frequency components which may be processed to obtain a difference signal which represents the selected (desired) motions in any of three orthogonal directions (vertical, horizontal-inline and horizontal-crossline horizontal) at a remote location.

An additional object of this invention is to provide a method for a remote sensing system which uses a laser sensing beam and a return beam in such a manner that there is approximately no difference signal due to atmospheric effects placed on either the sensing beam or the return beam.

In accordance with the objects of the present invention, there is provided a remote sensing system which is a bipolarized, differential mode, LDI (laser differential interferometry) system. Although, the description of the present invention in this specification emphasizes its use as a remote seismic sensing system to detect seismic traces from ground motions at a selected location, the invention may also be used for other remote sensing applications.

The bipolarized, differential mode, LDI system of this invention uses a retroreflector apparatus (target), which is coupled to motions at the selected location, the target is functional to convert a sensing beam into a return beam which has two transversely polarized overlapping return sensing signals, one of the sensing signals having been frequency modulated to contain frequency components that represent selected (desired) motions at the selected location. The return beam is then detected; return sensing signals are separated from the return beam; and then, the return sensing signals are combined, in preferred embodiments, by electronic and/or by optical heterodyning techniques to cancel common mode signals that were present on the sensing and return beam, thereby, leaving a difference signal which represents the selected motions at the remote selected location.

In one preferred embodiment of the retroreflector apparatus, a casing is coupled to motions at the selected location and a polarizing beamsplitter is rigidly attached to the casing. When the beamsplitter is illuminated by an approximately horizontal sensing beam, the beam is split by the beamsplitter into two polarized sensing signals, a first and a second polarized sensing signal. The polarity of the first sensing signal is orthogonal with respect to the polarity of the second sensing signal. The beamsplitter is aligned to deflect the first polarized signal downward along a vertical ordinate to encounter a first corner-cube retroreflector. The first retroreflector is attached to the casing but inertially isolated from motion in the vertical direction. The first retroreflector reflects the first polarized sensing signal back into the beamsplitter, which again deflects the signal.

Each time the beamsplitter deflects the first polarized sensing signal, the first signal is Doppler shifted to have frequency components which represent certain motions that are coupled to the beamsplitter. The certain motions include the selected motions. A first grouping of Doppler shifted frequency components on the first polarized sensing signal that are produced during the first deflection are, again, Doppler shifted by the beamsplitter during the second deflection to form a group of frequency components which represent the cumulative Doppler shifting motions in the vertical and horizontal-inline directions that were coupled to the beamsplitter through the casing. The first retroreflector, being inertially isolated, does not move in the vertical direction; thus, it does not provide any Doppler shifted frequency components to the first polarized sensing signal.

The second polarized sensing signal passes through the beamsplitter to encounter a second corner-cube retroreflector which is rigidly attached to the casing. In reflecting this signal back into the beamsplitter, the second retroreflector Doppler shifts the second polarized sensing signal to have frequency components which represent horizontal-inline motions coupled to the retroreflector through the casing.

After the reflected first polarized sensing signal is deflected in the beamsplitter (the second deflection), the signal is aligned to a return propagation path and is designated, herein, as a first return signal. The return path of the reflected second polarized signal is also aligned with the return propagation path and when the reflected second polarized sensing signal returns to the beamsplitter, it is designated, herein, as a second return sensing signal.

The first and second return sensing signals are combined in the beamsplitter to form a return beam. The return beam is a transversely polarized beam in which the two return sensing signals substantially overlap so that the sensing signals are exposed to the same air space on the return trip to the receiver. Accordingly, the return beam has frequency components which represent motions at the selected location. The first return sensing signal has frequency components which represent vertical and horizontal-inline motions. The second return sensing signal has frequency components which represent horizontal-inline motions. After detection, through a heterodyne process, the common mode signals (the horizontal-inline motions, as well as any other common mode signal which may have been added to the sensing beam or the return beam such as turbulent noise) are canceled, leaving a frequency modulated difference signal which represents the selected motions of this embodiment, i.e., vertical motions. The difference signal can then be frequency demodulated to provide an amplitude modulated signal (e.g., a seismic trace) which represents vertical motions (e.g., vertical ground motions) at the selected location.

These and other objects and advantages of the present invention will no doubt become apparent to those of skill in the art after having read the following detailed description of the preferred embodiments which are contained herein and illustrated by various figures.

The invention encompasses the heretofore described preferred embodiments as well as the embodiments as are described hereinafter and as will be apparent to those of skill in the art.

BRIEF DESCRIPTION OF THE DRAWING

FIG. 1A is a prior art cross sectional front view of a prior art detector.

FIG. 1B is a cross sectional side view of the prior art detector of FIG. 1A.

FIG. 2A is a simplified cross sectional diagram of a circularly polarized sensing beam.

FIG. 2B is a simplified cross sectional diagram of a vertical polarized sensing signal.

FIG. 2C is a simplified cross sectional diagram of a horizontal polarized sensing signal.

FIG. 2D is a simplified cross sectional diagram of a transverse polarized sensing beam having two signals on the beam.

FIG. 2E is a simplified cross sectional diagram of a horizontal polarized sensing signal and a vertical polarized sensing signal which are not aligned to share the same air space.

DETAILED DESCRIPTION OF THE PREFERRED EMBODIMENTS

Figure 3A:
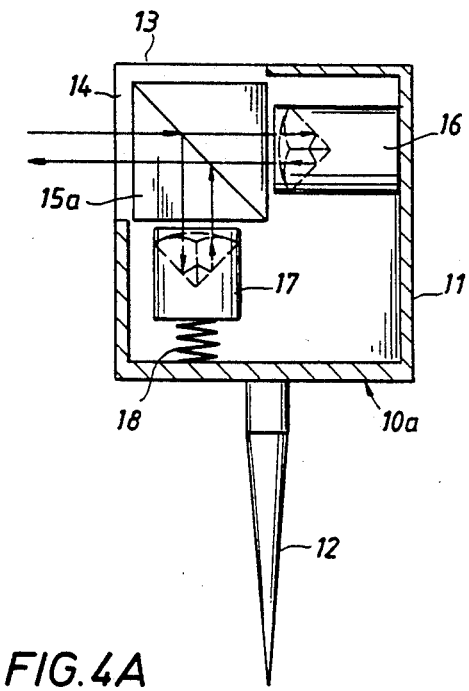
FIG. 3A is a simplified cross sectional side view of a retroreflector apparatus of this invention for detecting vertical motions, the apparatus having a polarizing beamsplitter. This figure also includes a simplified side view of an optical block diagram.

The invention is a radar system which remotely senses motion by bipolarized, differential mode, laser Doppler interferometry. The radar system could be either airborne or ground based. The remote sensing system includes a sensing beam generation and transmission system, a retroreflector apparatus (target), and a receiver which includes a return beam detection system and a demodulation system. The system is described herein for remotely detecting motions of the earth at a single selected (remote) location. However, it should be understood that a plurality of the described embodiments of this invention will provide for remotely measuring the motions of the earth at many remote locations simultaneously. In addition, this invention is not limited to the detection of just ground motions. The motions in this specification are described in terms of ground motions having three orthogonal directions; however, the motions detectable by this invention do not have to be ground motions. Any motions which may be coupled to the target of this invention, such as, motions on a building, a bridge, or aircraft may be detected in any of three orthogonal directions with embodiments of this invention from a single viewing point (i.e., the location of the transmitter and receiver). Additionally, homodyning or heterodyning may be used by the receiver to obtain a difference signal which represents desired motions. However, heterodyning is preferred since this process provides an indication of "up" and "down" Doppler motions.

In preferred embodiments of the present invention, methods and apparatus are provided for remotely sensing seismic vibrations at the earth's surface. The radar system uses a continuous wave (CW) or pulsed laser beam to provide a transmitted sensing beam which illuminates a retroreflector apparatus (target) at a remote location where seismic signals are to be detected. Preferably, the sensing beam has a substantially monochromatic frequency.

Retrophone is also used, herein, to refer to the retroreflector apparatus (target) of this invention. The target is a bipolarized dual retroreflector. The retrophone has a casing which is coupled to motions of the earth at a remote location. Upon illumination of the target, the target converts the transmitted sensing beam into a return beam having two transverse overlapping return sensing signals, one of the return sensing signals having been frequency modulated to represent selected (desired) motions of the earth, the selected motions being among the motions coupled to the casing. Initially, the target separates the sensing beam into two sensing signals. Preferably, these sensing signals are separated or passed through polarizers to have polarities which are orthogonal to each other. By the placement of optical components normal to the path of the sensing signals within the retrophone, these optical components are used to deflect and/or reflect the sensing signals. Some of these previously mentioned optical components are attached to the casing such that they are coupled to the ground motions. When these coupled components move as a result of the ground motions, the components cause either or both of the two sensing signals to be frequency modulated (FM); the movement of the ground coupled components inline with the paths of the signals imposes a Doppler shift on the sensing signals at each location within the target where these moving components reflect and/or deflect the signals.

The cumulative (net) Doppler shift imposed on the signals represent the net relative motions (velocities) of the Doppler shifting optical components with respect to the incident paths of the signals striking the coupled components. Since the velocities and/or movements of the optical components are a function of the movements of the earth, the retrophone of this invention imposes Doppler shifts on the sensing signals which are proportional to the surface particle velocity at the remote location for certain ground motions. Embodiments of this invention may have different arrangements of optical components to intercept the sensing signals. This enables the retrophone of this invention to modulate the sensing signals with various combinations of Doppler shifts.

The sensing signals, after being reflected/deflected through the target become return sensing signals. The return sensing signals are combined to form a return beam. Preferably, the return beam has the return sensing signals oriented such that the signals on the beam are transversely polarized with respect to each other. And, in addition, the return sensing signals are oriented on the return beam such that the two signals overlap so that the signals occupy substantially the same air space on the return propagation path of the return signal to the receiver.

The return beam is detected by the return beam detection system of the receiver. At the receiver, in preferred embodiments, the electronic and/or optical combination of the return sensing signals in a heterodyne process results in a frequency modulated difference signal, which depending upon the embodiment used, represents vertical, horizontal-inline or horizontal-crossline motions of the earth at the remote location. By demodulating the frequency modulated signal, a time varying signal is produced which represents a seismic trace of the desired seismic motions.

The term "differential-mode" in this specification is used to indicate that two signals are returned from the remote location. However, as discussed previously, two return signals may be subject to different atmospheric effects. The bipolarized, differential-mode, LDI remote sensing system of this invention overcomes the problem of turbulent noise because the system of this invention uses a single sensing beam to illuminate the target and to receive in return a single return beam having two sensing signals on the return beam; thus, atmospheric effects on the beams result in common mode signals.

The single beam is separated by the target into two sensing signals which are then used to detect certain motions coupled to the casing by imposing Doppler shifts on one signal or both signals. Since the two sensing signals are obtained from a single beam, both signals have been affected equally by the atmosphere on the propagation path from the transmitter to the target; thus, the atmospheric effects on the two sensing signals are common mode signals. Similarly, after the motions are detected, the two return sensing signals form a single return beam. The two return sensing signals on the return beam are aligned to overlap on the return beam and travel through substantially the same air space on a return propagation path to the receiver; thus, the atmospheric effects on the two return signals on the return beam are common mode signals.

In one highly preferred embodiment, a circularly polarized sensing beam is used. It is well known to practitioners of the art that circularly polarized light is a special case of a transverse polarized beam. It may be considered as two beams (a first and a second polarized component) of equal intensities and of the same frequency such that the two components have perpendicular polarizations with a common propagation vector which rotates at the same frequency as the carrier frequency. FIG. 2A is a simplified cross sectional representation of a circularly polarized sensing beam. Within embodiments of the retroreflector apparatus, the circularly polarized beam is separated into two non-rotating polarized signals of the same frequency. Preferably, the polarities of the two signals are orthogonal to each other.

It is also possible to obtain two polarized sensing signals within the retroreflector apparatus from other forms of sensing beams including the case of a sensing beam having a single non-rotating polarization. Preferably, the polarization angle for such a beam is approximately 45 degrees between the desired polarization planes of the separated signals. FIGS. 2B and 2C are simplified cross sectional representations of polarized components (signals) with FIG. 2B representing a polarized component (signal) having a vertically polarized sensing signal and FIG. 2C representing a polarized component (signal) having a horizontally polarized sensing signal. FIG. 2D is a simplified cross section which represents a vertical and horizontal polarized signal combined to show a transversely polarized beam having two polarized signals which overlap and occupy substantially the same air space. These transverse signals in the beam of FIG. 2D may or may not have the same carrier frequency.

RETROREFLECTOR APPARATUS

FIG. 3A is a side view and a simplified optic block diagram of one embodiment of the retroreflector apparatus of this invention having a polarizing beamsplitter. The retroreflector apparatus 10a is a remote detector (target) for obtaining a desired signal (selected motion) which represents the vertical motions of the earth. The operation of the embodiment of FIG. 3A will be described with a circularly polarized sensing beam; however, the embodiments of 3A as well as other embodiments to be shown hereinafter are also capable of operating with any sensing beam provided that each sensing signal separated from the sensing beam has enough power to be processed by the receiver.

In the embodiment shown in FIG. 3A, a casing 11 of the retroreflector apparatus 10a is coupled to the motions of the earth by spike 12. The apparatus 10a has windows at the top 13 and the side 14. The retroreflector apparatus 10a also has: a polarizing beamsplitter cube 15a which is rigidly attached (seismically coupled) to the casing 11, a corner-cube retroreflector 16 which is also rigidly attached (seismically coupled) to the casing 11 and located behind the beamsplitter 15a, and a corner-cube retroreflector 17 below the beamsplitter 15a. Retroreflector 17 is attached to an inertial coilform 18 which is attached to the casing 11. The inertial coilform damps motion in the vertical direction such that corner-cube retroreflector 17 is inertially isolated from the earth's motions in the vertical direction.

The inertial coilform may provide inertial isolation by using a mass and spring, a dashpot or other means known in the art to isolate ground motions or vibrations from a component within a device.

Figure 3B:
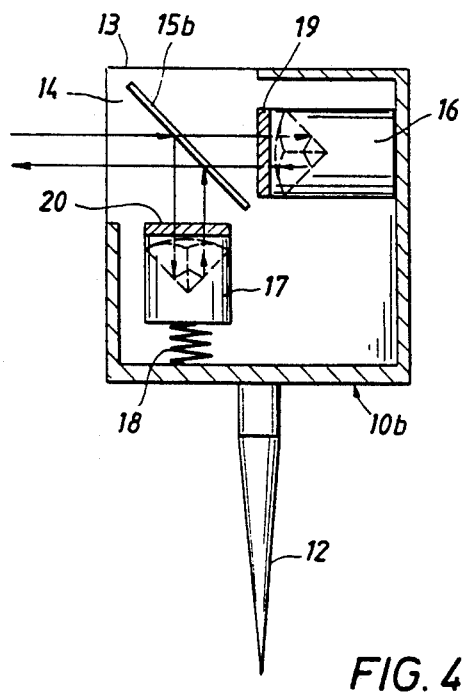
FIG. 3B is a simplified cross sectional side view of a retroreflector apparatus of this invention for detecting vertical motions, the apparatus having a nonpolarizing beamsplitter. This figure also includes a simplified side view of an optical block diagram.

FIGS. 3A and 3B have simplified optical diagrams to show the paths of small cross sectional areas of the sensing signals within the retroreflector apparatus to aid with the explanation of the operation of this invention. However, the paths shown are not to scale. The circularly polarized sensing beam (or any sensing beam), preferably, has a cross sectional area normally incident upon a window of the device which illuminates substantially all of the window. The controlling factor for illumination of the apparatus is that the intensity of the illumination provided to the target is such that the return beam will have enough power in each return sensing signal to ensure an adequate carrier to noise ratio (CNR) for heterodyning (or homodyning) and demodulating each signal. The cross sectional area of the sensing beam or return beam may increase over the distances involved in this invention due to beam spreading (diffusion). However, it is possible to control the intensity of the sensing or return beam by using additional optical elements to control the rate of beam spreading from the transmitter to the target and/or compress the return beam at the receiver.

FORMATION OF THE RETURN BEAM

The formation of the return beam by the retroreflector will be initially discussed. This discussion will apply in general to other embodiments disclosed herein. Various embodiments will then be described to show how the sensing signals are frequency modulated within the target so that the return beam contains frequency components which include the selected ground motions.

Herein, a common convention will be used to relate the retroreflectors to a particular sensing signal as an aid in understanding the specification and the claims. A sensing signal which is deflected by a beamsplitter will be the first sensing signal and the retroreflector related to that first sensing signal will be the first retroreflector; thus, depending upon the embodiment a first retroreflector could be seismically coupled or it could be inertially isolated from motions in one direction. A similar convention is used for the second sensing signal.

Returning to FIG. 3A, the circularly polarized sensing beam is split, i.e., the beam is separated into vertically and horizontally polarized signals, by the polarizing beamsplitter cube 15a. To discuss this embodiment, assume illumination through side window 14, so a first polarized sensing signal can be related to horizontal polarization (as shown in FIG. 2C) and a second polarized sensing signal can be related to vertical polarization (as shown in FIG. 2B) for the explanation of this FIG. 3A. In this configuration, the first polarized sensing signal (horizontally polarized) is deflected downward from the polarizing beamsplitter 15a along a vertical ordinate and is reflected by the inertially isolated retroreflector 17 (a first retroreflector in this embodiment). Simultaneously, the second polarized sensing signal (vertically polarized) passes through the beamsplitter cube along a horizontal-inline ordinate and reflects from the seismically coupled retroreflector 16 (a second retroreflector in this embodiment).

The direction of the polarity of sensing signals will also be used in explanations for other embodiments as an aid for understanding the operation of this invention. The orientation of the polarizing beamsplitter with respect to the sensing beam determines which of the polarization components separated from the sensing beam will be deflected by a polarizing beamsplitter. Using conventional optic terms, the transmitted beam may be separated by a beamsplitter into two polarized components which are transverse to each other (a P-component and a S-component). The P-component always passes through the polarizing beam splitter and the S-component is always deflected. The polarizing beamsplitter 15a of this particular embodiment of FIG. 3A is oriented so that when the side window 14 is illuminated, the beamsplitter deflects the S-component downward in the vertical direction to illuminate (first) retroreflector 17. Retroreflector 17 is aligned with the vertical direction. With beamsplitter 15a oriented and illuminated as described, the horizontally polarized sensing signal (the first polarized sensing signal) separated from the sensing beam is the S-component and the vertically polarized sensing signal (the second polarized sensing signal) is the P-component.

A corner-cube reflector, as mentioned previously, has the characteristic of returning a reflected signal exactly back on itself. If the two corner-cube retroreflectors are properly aligned with each other, the beamsplitter and the illuminated window, the sensing signals upon returning to beamsplitter will combine within the beamsplitter 15a to form a return beam having a direction of propagation opposite to the sensing beam. Since these signals have polarities which are orthogonal to each other, their combination on the return beam will form a transverse polarized beam. If the return sensing signals substantially overlap each other (as depicted in FIG. 2D), both polarized signals will pass through approximately the same air space (turbulence) in their path to the sensing beam detector; thus, the signals on the transverse polarized return beam will experience approximately the same fluctuations in their carrier frequency due to atmospheric effects and these fluctuations will be common mode signals.

Conversely, if one of the retroreflectors 16, 17 is misaligned, then the return sensing signals do not completely overlap each other (as depicted in FIG. 2E) and a different turbulence region is encountered by the two signals. In this case, the turbulence noises on the two return sensing signals differ, i.e., the turbulence does not impose the same common mode signal on both signals, and complete cancellation is not achieved.

Other types of retroreflectors may be used to provide the same function. However, since a property of a corner-cube retroreflector is to return an incident signal approximately on itself within certain angle limits independent of the orientation of the retroreflector, the use of corner-cube retroreflectors is preferred as components for embodiments of this apparatus. The use of corner-cube retroreflectors enables the target of this invention to have fairly robust alignment characteristics with respect to the alignment of the corner-cubes to the remaining components of apparatus and to the sensing beam; thus, the corner-cube retroreflectors ensure that the return sensing signals combine in the beamsplitter to form a return beam which has a return propagation path centered approximately on the incident propagation path of the sensing beam. The alignment of the retroreflectors also ensures that the return sensing signals substantially overlap on the return beam for the return trip to the receiver.

VERTICAL GROUND MOTION DETECTION

As previously mentioned, illumination of either window 13, 14 in FIG. 3A results in return sensing signals on the return beam that when processed will provide a difference signal which contains the earth's vertical motions coupled to the apparatus 10a.

When the side window 14 of FIG. 3A is illuminated by a sensing beam, the sensing beam is split by the polarizing beamsplitter 15a into two polarized sensing signals, each sensing signal having a different propagation path within the retrophone. A first polarized sensing signal is formed from the horizontal polarized electromagnetic radiation of the circularly polarized sensing beam that was separated in the polarizing beamsplitter 15a. The polarizing beamsplitter 15a also deflects the first polarized sensing signal downward such that the path of the signal is along a vertical ordinate into the inertially isolated retroreflector 17 (a first retroreflector for this embodiment).

A second polarized sensing signal is formed by the polarizing beamsplitter 15a from the vertically polarized electromagnetic radiation of the circularly polarized sensing beam. The second polarized sensing beam passes through the polarizing beamsplitter 15a undeflected. The direction of the path of propagation of the second polarized sensing signal is along the horizontal-inline direction; this path is substantially a continuation of the propagation path of the sensing beam into the polarizing beamsplitter 15a. Consequently, the path of the first polarized sensing signal is approximately perpendicular to the path of the second polarized sensing signal.

Since the polarizing beamsplitter 15a is seismically coupled to the casing 11, the beamsplitter moves with the ground motions in the vertical and horizontal (both inline and crossline) directions. Certain casing motions modulate the first polarized sensing signal each time the signal is deflected by the beamsplitter 15a. The vertical and horizontal-inline motions of the beamsplitter 15a will initially frequency modulate the first polarized sensing signal (the horizontally polarized signal) as the beamsplitter 15a deflects the first polarized sensing signal into the inertially isolated retroreflector 17. The frequency modulated first polarized sensing signal, at this point, will have a grouping of frequency components which represent the vertical and horizontal-inline motions coupled to the polarizing beamsplitter 15a.

Inertially isolated retroreflector 17 is aligned with the first polarized sensing signal so that it reflects the deflected signal (the first polarized sensing signal) back into the polarizing beamsplitter 15a. The inertially isolated retroreflector 17 does not contribute to the net Doppler shift on the first polarized sensing signal for vertical, horizontal-inline or horizontal crossline ground motions. There is no Doppler shift for vertical motions when the signal is reflected because the retroreflector 17 is inertially isolated from ground motions in the vertical direction and does not move in that direction. Although retroreflector 17 does move in the horizontal-inline and horizontal-crossline directions, as discussed previously, the retroreflector does not have a net Doppler shift on the signal for lateral motions because the Doppler shifts on the signal caused by lateral motions (here, horizontal-inline and horizontal-crossline motions) on the corner-cube retroreflector will cancel as the signal is reflected off the three mutually perpendicular reflectors.

After reflecting from the retroreflector 17, the reflected first polarized sensing signal is again deflected by polarizing beamsplitter 15a to form a first return sensing signal. The first return sensing signal has been deflected such that it has a direction of propagation that is opposite to the sensing beam. In addition, the first return sensing signal has a return propagation path that is centered approximately on the incident path of the sensing beam as it entered the beamsplitter 15a. In deflecting the reflected first polarized sensing signal, the beamsplitter 15a, again, frequency modulates the first polarized sensing signal by Doppler shifting the first grouping of frequency components into a group of frequency components. Since, the relative motion of the polarizing beamsplitter 15a to the incident path of the reflected first polarized signal is similar to the relative motion of the beamsplitter 15a to the incident path of the sensing beam, the cumulative Doppler shift for the frequency components of the group of frequency components will be the net relative inline motions of beamsplitter 15a in the vertical and horizontal-inline directions.

The amount of frequency modulation (net Doppler shift) on the first return sensing signal for vertical and horizontal-inline ground motions of the beamsplitter 15a is, as mentioned previously, is dependent upon the relative inline velocity of the vertical and horizontal-inline movement of the beamsplitter 15a with respect to the incident paths at the points of deflection each time the signal is deflected within the beamsplitter. The beamsplitter 15a does not impart a Doppler shift on the deflected signals for horizontal-crossline motions because the deflection points within beamsplitter 15a are parallel to the horizontal-crossline direction; thus, the polarizing beamsplitter 15a has no net motion with respect to the path of the signals in the horizontal-crossline direction, i.e., the Doppler shifting motions of the beamsplitter's deflection points are those motions which move in an inline direction with respect to the paths of the sensing signals (the vertical or horizontal-inline directions in this case) and the beamsplitter motions perpendicular to those paths do not Doppler shift the signals because these motions do not lengthen or reduce the length of these paths.

The second polarized sensing signal (the vertical polarized signal) of FIG. 3A, as mentioned, passes through polarizing beamsplitter 15a (the P-component separated from the transmitted beam). Since the polarizing beamsplitter 15a does not reflect or deflect this signal, the beamsplitter 15a does not Doppler shift this signal.

This second polarized sensing signal then encounters the seismically coupled corner-cube retroreflector 16 (the second retroreflector for this embodiment). This retroreflector 16 is aligned with the horizontal-inline direction and it reflects this signal back into the polarizing beamsplitter 15a after Doppler shifting the signal. Retroreflector 16 Doppler shifts the second polarized sensing beam to have frequency components which represent horizontal-inline motions coupled to the retroreflector 16. However, as discussed previously, the Doppler shifts resulting from lateral motions of the retroreflector (here, vertical and horizontal-cross line motions) will cancel in the retroreflector.

The reflected second polarized sensing signal enters the beamsplitter 15a where it becomes the second return sensing signal. The second return sensing signal is combined within the beamsplitter 15a (acting as a beam combiner) with the first return sensing signal to form the return beam having transverse polarized sensing signals which substantially overlap as shown in FIG. 2D. The second return sensing signal (the vertically polarized signal) on the return beam contains horizontal-inline motion Doppler shifted frequency components and the first return sensing signal (the horizontally polarized signal) on the return beam contains vertical and horizontal-inline motion Doppler shifted frequency components. The common mode signals (the horizontal-inline Doppler frequency components) will be rejected in the receiver. Thus, the desired Doppler signal, for this configuration of the retroreflector apparatus with side window illumination, represents vertical ground motions.

Apparatus 10a as well as other embodiments presented in this specification may also be used with a remote sensing system which is elevated above the remote location, such as, an airborne system. Lenses, wedges or other optical equivalents may be mounted on either the top 13 or side 14 window to increase or change the field of view to the retroreflector apparatus of this invention. Preferably, if beam deflection is used to increase the field of view, the deflected sensing beam should enter the top 13 or side window 14 such that the incident path of propagation for the beam at the beamsplitter after deflection is aligned with the internal optical components of the apparatus to obtain the desired Doppler signal.

For top window 13 illumination of the embodiment of 3A, the sensing beam enters the window approximately vertical to the detector 10a. Top window illumination of this embodiment will result in a return beam having return sensing signals which contain a difference signal between them that represents vertical motions; but, the return sensing signals will not contain any common mode signals which represent horizontal-inline motions. However, two return sensing signals are still beneficial because the atmospheric effects as well as other common effects on the sensing and return beam will still be common mode and cancel in the receiver.

The following explanation of top window illumination and other explanations of top window embodiments to be described later herein will be in terms of the sensing beam having some deviation from the vertical so that the terms "horizontal-inline" and "horizontal-crossline" will still apply for the direction of ground motions.

With the orientation of beamsplitter 15a as previously described, the polarizing beamsplitter 15a will separate a circularly polarized sensing beam which illuminates the top window 13 into a first polarized sensing signal and a second polarized sensing signal. The polarity of the first polarized sensing signal is orthogonal with respect to the polarity of the second polarized sensing signal. Here, the polarity (at incidence of the sensing beam on the beamsplitter) of the first polarized sensing signal is in the horizontal-crossline direction and is the S-component of the sensing signal with respect to the orientation of polarizing beamsplitter 15a in the configuration of FIG. 3A. The polarity of the second polarized sensing signal is in the horizontal-inline direction and is the P-component of the sensing signal.

The first polarized sensing signal is deflected by the polarizing beamsplitter 15a into seismically coupled retroreflector 16 (a first retroreflector in this embodiment). Beamsplitter 15a, in deflecting the first polarized sensing signal (the deflected signal), also Doppler shifts the deflected beam to have a first grouping of frequency components which represent the vertical and horizontal-inline motions of the ground motions coupled to beamsplitter 15a.

Retroreflector 16 also frequency modulates the first polarized sensing signal (the deflected signal) for horizontal-inline motions by Doppler shifting the first grouping of frequency components into a second grouping of frequency components. The second grouping includes the Doppler shift contribution of seismically coupled retroreflector 16 which has a relative motion opposite to beamsplitter 15a in the horizontal-inline direction.

The reflected signal from retroreflector 16 is again deflected by the polarizing beamsplitter 15a to provide a first return sensing signal. This signal has a return propagation path out of the beamsplitter that is centered approximately on the propagation path of the sensing beam into the beamsplitter 15a. In deflecting the reflected first polarized sensing signal, the beamsplitter 15a again frequency modulates the signal by Doppler shifting the second grouping of frequency components into a group of frequency components. The net Doppler shift on the first return sensing signal (the group of frequency components) represents the cumulative motion of the vertical motions coupled to the beamsplitter 15a. The horizontal-inline Doppler shifted frequency components are canceled within the target.

The second polarized sensing signal passes through the beamsplitter 15a without being Doppler shifted. The second polarized sensing signal then encounters retroreflector 17 (the second retroreflector) which is inertially isolated in the vertical direction. Since there is no movement of the retroreflector 17 in the vertical direction, the second polarized sensing signal is not Doppler shifted by retroreflector 17 for vertical motions nor does the corner-cube retroreflector contribute Doppler shifts for lateral motions, as previously explained. Consequently, the second polarized sensing signal is reflected back to beamsplitter 15a where it becomes the second return sensing signal without any Doppler shifted frequency components which represent ground motions being present on the signal.

The first return sensing signal and the second return sensing signal are combined in beamsplitter 15a to produce a transverse polarized return beam which exits the top window 13 for detection by the receiver. The difference signal between the return sensing signals on the return beam represents the vertical motions of the earth at the remote location.

As before with the side window illumination embodiment of FIG. 3A, the top window 13 illumination of this embodiment does not provide any Doppler shifts for horizontal-crossline motions of the earth in either sensing signal. This is because, as described previously, the horizontal-crossline motions of the deflection points within polarizing beamsplitter 15a are perpendicular to the path of the each deflected signal.

FIG. 3B is a simplified side view of another retroreflector apparatus embodiment of the present invention which uses a nonpolarizing beamsplitter 15b rigidly coupled to casing 11. The retroreflector apparatus 10b of FIG. 3B is similar to the embodiment presented in FIG. 3A. In the embodiment of FIG. 3B, the casing 11 of the retroreflector apparatus 10b is also coupled to the motions of the earth by the spike 12. The apparatus 10b also has windows at the top 13 and the side 14. And, retrophone 10b has one corner-cube retroreflector 16 rigidly attached to the casing 11 and aligned with the horizontal-inline direction. Inertially isolated cornercube retroreflector 17 is also included in this embodiment, and it is attached to the inertial coilform 18. Again, in this embodiment, the inertial coilform 18 damps motion in the vertical direction such that cornercube retroreflector 17 is inertially isolated from the earth's motions in the vertical direction.

The embodiment of FIG. 3B uses the nonpolarizing beamsplitter 15b with a vertically polarized screen 19 and a horizontally polarized screen 20 to perform the same functions as the polarizing beamsplitter 15a of FIG. 3A. Preferably, the nonpolarizing beamsplitter is oriented at approximately 45 degrees from vertical and planar to the crossline direction. The operation of retroreflector 10b is first described herein in terms of a circularly polarized sensing beam illuminating a side window 14, and then the operation is described for top window 13 illumination.

The nonpolarizing beamsplitter 15b, preferably, deflects approximately half the beam downward along the vertical ordinate to form the first sensing signal and allows approximately half of the circularly polarized beam to pass straight through (here, along the horizontal-inline ordinate) as the second sensing signal.

The first sensing signal, in being deflected (reflected) by nonpolarizing beamsplitter 15b, is Doppler shifted by the beamsplitter 15b to contain frequency components which represent vertical and horizontal-inline motions coupled to the beamsplitter 15b. The first sensing signal (still circularly polarized) then encounters the horizontally polarized screen (polarizer) 20 (the polarity given here is with respect to the orientation of the sensing beam at incidence on side window 13) located over inertially isolated retroreflector 17 (a first retroreflector in this embodiment). Vertically polarized electromagnetic radiation from the circularly polarized beam (this polarity is now in the horizontal-inline plane due to the deflection of the signal) is absorbed by the screen. Horizontal polarized electromagnetic radiation (this polarity is in the horizontal-cross line plane) passes through the screen 20 as a first polarized signal (the polarity of this signal is orthogonal with respect to the polarity of a second polarized signal to be discussed herein later).

The first polarized signal reflects from the inertially isolated retroreflector 17 back into beamsplitter 15b. A portion (approximately one half of the signal in this embodiment) of the reflected first polarized signal is deflected and Doppler shifted by the beamsplitter 15b to form the first return sensing signal. The undeflected portion (approximately one half in this embodiment) of the reflected signal passes through the beamsplitter and is not used.

In deflecting the portion of the reflected first polarized signal, the beamsplitter 15b frequency modulates the deflected portion by Doppler shifting the first grouping of frequency components into a group of frequency components which represent the cumulative motions of the beamsplitter in the vertical and horizontal-inline directions.

The second sensing signal when passing though beamsplitter 15b is not Doppler shifted by the beamsplitter 15b. The circularly polarized beam of the second sensing signal then encounters the vertically polarized screen (polarizer) 19 which allows electromagnetic radiation that is vertical polarized to pass through as a vertical polarized beam (the second polarized signal) to reflect from the seismically coupled retroreflector 16 (the second retroreflector). The vertically polarized screen 19 absorbs the horizontal polarized radiation of the circularly polarized beam. The second polarized signal is Doppler shifted by retroreflector 16 in the same manner as described in the embodiment of FIG. 3A for side window illumination and reflected back to beamsplitter 15b. Consequently, the reflected second polarized signal contains Doppler shifted frequency components which represent horizontal-inline motions. At beamsplitter 15b a portion (about half of the signal) of the reflected second polarized signal passes through the beamsplitter 15b, as the second return sensing signal. Here, the beamsplitter 15b also deflects a portion (about half of the signal) of the reflected second polarization signal. This signal is deflected upward and not used. The second return sensing signal is combined with the first return sensing signal in the beamsplitter 15b to form a return beam.

Again, if the retroreflectors 16, 17 are aligned properly, with respect to each other, the illuminated window, and the nonpolarizing beamsplitter 15b, the return beam contains transverse polarized return sensing signals which substantially overlap.

The retroreflector apparatus 10b of FIG. 3B also provides Doppler shifts as described for top window 13 illumination in the embodiment of FIG. 3A. The major difference between the two embodiments of FIGS. 2A and 2B for top window 13 and side window 14 illumination is the loss of approximately three-fourths of the power of the sensing beams in converting the sensing beam into the return beam. This loss is due to the absorption of the transverse electromagnetic radiation of the sensing signals which do not pass through the polarized screens 19, 20 and the portions of the reflected signals which are not combined in the beamsplitter 15b to form the return beam.

The polarization orientations of the polarizing screens (polarizers) may be reversed or rotated for other embodiments of this invention. However, it is highly preferred that the polarizers are orientated to ensure the polarities for the return sensing signals which make up the return beam remain orthogonal with respect to each other.

In a highly preferred embodiment which uses an infrared sensing beam (preferably circularly polarized), the nonpolarizing beamsplitter and the polarizers are wire grid polarizers.

HORIZONTAL-INLINE GROUND MOTION DETECTION

By interchanging the inertially isolated corner-cube reflector 17 and the seismically coupled reflection 16 in either FIG. 3A or FIG. 3B, the retroreflector apparatus of this invention has additional embodiments which provide the ability for the remote sensing system to obtain a difference signal which represents horizontal-inline motions of the earth at the remote (selected) location. The retroreflector apparatus 10c of FIG. 4A, again, has top 13 and side 14 windows. It also has a polarizing beamsplitter cube 15a (oriented as previously described and rigidly attached to casing 11), a corner-cube retroreflector 24 rigidly attached to the casing 11 below polarizing beamsplitter 15a, and another corner-cube retroreflector 25 behind beamsplitter 15a and attached to an inertial coilform 18. The inertial coilform 18 damps motion in the horizontal-inline direction such that corner-cube retroreflector 25 is inertially isolated from the earth's motions in the horizontal-inline direction.

Figure 4A:
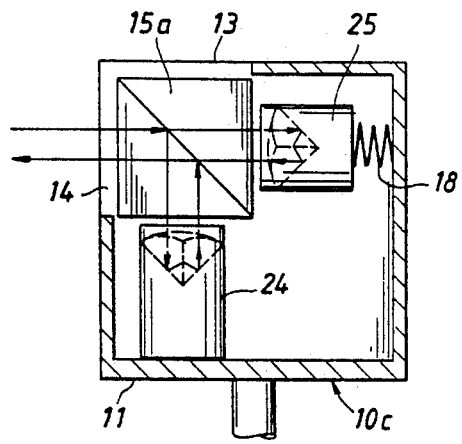
FIG. 4A is a simplified cross sectional side view of a retroreflector apparatus for detecting horizontal-inline motions, the apparatus having a polarizing beamsplitter. This figure also includes a simplified side view of an optical block diagram.
Figure 4B:
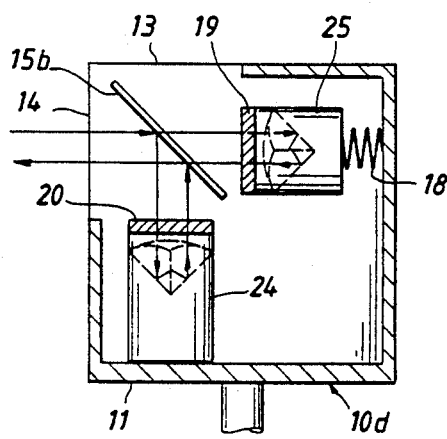
FIG. 4B is a simplified cross sectional side view of a retroreflector apparatus for detecting horizontal-inline motions, the apparatus having a nonpolarizing beamsplitter. This figure also includes a simplified side view of an optical block diagram.

The retroreflector apparatus 10d of FIG. 4B has the same components and configuration as the embodiment of FIG. 4A, except that this embodiment has a nonpolarizing beamsplitter 15b and a vertically polarized screen 19 and a horizontally polarized screen 20 as a substitute for the polarizing beamsplitter 15a of FIG. 3A.

The operation of the retroreflector apparatus 10c of FIG. 4A is similar to the operation of the target 10d of FIG. 4B, thus, only the retroreflector apparatus 10c of FIG. 4A will be explained in detail herein. Referring now to FIG. 4A, with the side window 14 illuminated, the horizontally polarized electromagnetic radiation is separated from the circularly polarized beam by polarizing beamsplitter 15a to form a first polarized sensing signal (this signal is horizontally polarized and the S-component for this beamsplitter 15a orientation). Beamsplitter 15a deflects the first polarized sensing signal (the deflected signal) downward to encounter seismically coupled corner-cube retroreflector 24 (a first retroreflector in this embodiment). The polarizing beamsplitter 15a Doppler shifts the first polarized sensing signal each time it is deflected by the polarizing beamsplitter 15a, as previously described in other embodiments, due to the horizontal-inline and vertical motions coupled to the beamsplitter. Seismically coupled retroreflector 24 has a relative inline motion in the vertical direction that is opposite to the relative inline vertical motion of beamsplitter 15a with respect to the first sensing signal; thus, the cumulative Doppler shift on the first return sensing signal will not include Doppler shifted frequency components for vertical motions because they cancel within the target, but the signal will contain Doppler shifted frequency components which represent horizontal-inline motions.

The vertically polarized electromagnetic radiation of the circularly polarized beam passes through polarizing beamsplitter 15a, forming the second polarized sensing signal (this signal is vertically polarized and the P-component for this polarizing beamsplitter orientation). The signal then encounters inertially isolated retroreflector 25 (a second retroreflector for this embodiment) which reflects the signal back within the beamsplitter as the second return sensing signal. This retroreflector 25 is isolated from motions in the horizontal-inline director; thus, it does not provide a Doppler shift for horizontal-inline motions. Nor does retroreflector 25 provide a Doppler shift for lateral motions of the retroreflector.

The first return sensing signal (the horizontally polarized signal) is combined in the polarizing beamsplitter 15a with the second return sensing signal (the vertically polarized signal) to form the transverse polarized return beam which has substantial overlap between the return sensing signals. The return beam when detected and heterodyned, in preferred embodiments, will provide a frequency modulated difference signal that represents the horizontal-inline motions at the remote location.

When the top window 13 of FIG. 4A is illuminated and with the orientation of polarizing beamsplitter 15a as previously described, the beamsplitter 15a will split the sensing beam into a first polarized sensing signal and a second polarized sensing signal. Here, the orientation of the polarization (at the incidence of the sensing beam on the beamsplitter) of the first polarized sensing signal is in the horizontal-crossline direction and is the S-component of the sensing signal with respect to the orientation of polarizing beamsplitter 15a in the configuration of FIG. 4A. The orientation of the polarization of the second polarized sensing signal is in the horizontal-inline direction and is the P-component of the sensing signal.

The first polarized sensing signal is deflected by beamsplitter 15a into inertially isolated retroreflector 25 (a first retroreflector of this embodiment) which reflects the signal back into the beamsplitter 15a. The beamsplitter 15a Doppler shifts the signal each time it passes through the beamsplitter, as previously described, due to the beamsplitter's inline motions in the horizontal-inline and vertical directions. Since retroreflector 25 is inertially isolated from horizontal-inline directions, it does not provide a Doppler shift to the signal for horizontal-inline directions. Consequently, after the signal is deflected the second time by the beamsplitter to form the first return sensing signal, the cumulative inline motions of the beamsplitter 15a in the vertical and horizontal-inline directions is represented by the Doppler shifted frequency components on the signal.

The second polarized sensing signal formed by the polarizing beamsplitter 15a passes through the beamsplitter to encounter seismically coupled retroreflector 24 (a second retroreflector for this embodiment). The second polarized sensing signal is Doppler shifted by vertical motions of the seismically coupled retroreflector 24 and returned to beamsplitter 15a where it becomes the second return sensing signal. The second return sensing signal is combined with the first return sensing signal in the beamsplitter 15a to form the transverse polarized return beam.

The signals on the return beam contain common mode signals which represent the vertical motions at the remote locations. When the signals on the beam are combined electronically or by optical heterodyning, in preferred embodiments, these common mode signals are canceled leaving a desired Doppler signal (the difference signal) which represents the horizontal-inline motions of the earth coupled through the casing.

As with the embodiments of FIGS. 3A and 3B—whether top window 13 or side window 14 illuminated—the embodiments of FIGS. 4A and 4B do not provide any Doppler shifts for horizontal-crossline motions of the earth in either polarized sensing beam because these motions in the horizontal-crossline direction at the deflection points of beamsplitter 15a are perpendicular to the length of the path of the incident beam.

HORIZONTAL-CROSSLINE GROUND MOTION DETECTION

Figure 5:
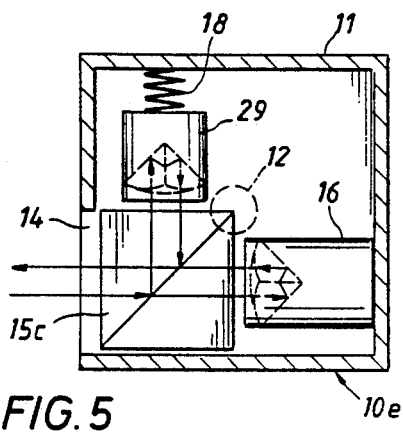
FIG. 5 is a simplified cross sectional top view of a retroreflector apparatus for detecting horizontal-crossline motions when using side-window illumination. This figure also includes a simplified top view of an optical block diagram.
Figure 6:
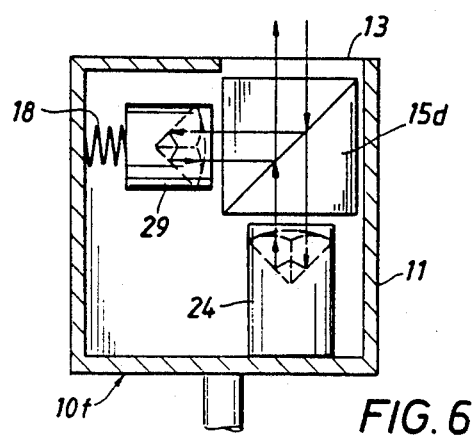
FIG. 6 is a simplified cross sectional front view of an additional embodiment of a retroreflector apparatus for detecting horizontal-crossline motions when using top-window illumination. This figure also includes a simplified side view of an optical block diagram.

FIG. 5 shows an embodiment of the retroreflector apparatus which can obtain a difference signal that represents horizontal-crossline motions of the earth at the remote location using side window 14 illumination. An additional embodiment is shown in FIG. 6 for horizontal-crossline motion detection which uses top window 13 illumination. Both embodiments shown may be adapted to operate with a nonpolarizing beamsplitter and polarizing screens as described earlier in this specification and these adaptations are herein included within the scope of this specification.

FIG. 5 is a simplified cross sectional top view of retroreflector apparatus 10e. FIG. 5 shows the retroreflector apparatus 10e to have a side illumination window 14, a polarizing beamsplitter 15c rigidly attached to the casing 11, a seismically coupled corner-cube retroreflector 16 connected to the casing 11 behind beamsplitter 15c, and an inertially isolated corner-cube retroreflector 29 that is orientated with the horizontal-crossline direction. The spike 12 on the underside of the casing 11 is indicated by the dashed curve in FIG. 5. The polarizing beamsplitter 15c has been rotated from the previous orientation for side window illumination, such that, when the side window 14 is illuminated, instead of deflecting the S-component of the sensing beam downward in the vertical direction, the polarizing beamsplitter 15c deflects the S-component to one side of the apparatus in the horizontal-crossline direction.

Apparatus 10e operates as follows. When the side window 14 of FIG. 5 is illuminated, a first and a second polarized sensing signal are separated from the circularly polarized sensing beam in the polarizing beam splitter 15c. The first sensing signal is vertically polarized and is the S-component of the sensing beam for this configuration. The second polarized sensing signal is horizontally polarized and is the P-component of the sensing beam.

The first polarized sensing signal is deflected by the polarizing beamsplitter 15c into inertially isolated corner-cube retroreflector 29 (a first retroreflector of this embodiment). Retroreflector 29 reflects the first polarized sensing signal back into beamsplitter 15c which again deflects the signal to form the first return sensing signal. In deflecting the first polarized sensing signal (twice), the signal is Doppler shifted by the beamsplitter 15c as previously described. However, in this case, the Doppler shifted frequency components on the first return sensing signal represent horizontal-inline and horizontal-crossline motions due to the ground motions coupled to the beamsplitter 15c. Inertially isolated retroreflector 29 does not Doppler shift the deflected signal, it only reflects the beam back to beamsplitter 15c.

The second polarized sensing signal passes through beamsplitter 15c to encounter seismically coupled retroreflector 16 (a second retroreflector for this embodiment) which is orientated with the horizontal-inline direction. Retroreflector 16 Doppler shifts the second polarized sensing signal to contain frequency components representing horizontal-inline motions as it reflects the signal back into the beamsplitter 15c.

This embodiment does not provide a Doppler shift for vertical motions because the vertical motions of beamsplitter 15c are perpendicular to the points of deflection of the signal within the beamsplitter, thus there is no relative motion of the beamsplitter in the vertical direction with respect to a deflected beam.

The first return sensing signal and the second return sensing signal (the reflected second sensing signal) are combined in the beamsplitter 15c into a return beam which enables both return sensing signals to travel through the same air space on the return trip to the receiver. In the receiver, the common mode frequency components will cancel (the horizontal-inline motion components) and a difference signal which represents horizontal-crossline motion will remain.

FIG. 6 is a simplified cross sectional front view of retroreflector apparatus 10f. FIG. 6 shows the retroreflector apparatus 10f to have a top illumination window 13, a polarizing beamsplitter 15d rigidly attached to casing 11, a seismically coupled corner-cube retroreflector 24 connected to the casing 11 below beamsplitter 15d, and an inertially isolated corner-cube retroreflector 29 which is orientated with the horizontal-crossline direction. The polarizing beamsplitter 15d has been rotated from the previous orientation of beamsplitter 15a of FIG. 3A so that when the top window 13 of this embodiment (FIG. 6) is illuminated, instead of diverting the S-component in the horizontal-inline direction, the polarizing beamsplitter 15d divers the S-component to one side of the apparatus in the horizontal-crossline direction.

Apparatus 10f operates as follows. When the top window 13 of FIG. 6 is illuminated, a first and a second polarized sensing signal are separated from the sensing beam in the beamsplitter 15b. The first polarized sensing signal has a polarity (at the incidence of the sensing beam on the beamsplitter) in the horizontal-crossline direction and is the S-component of the sensing beam for this configuration. The second polarized sensing signal has a polarity in the horizontal-inline direction and is the P-component of the sensing signal for this configuration.

The first polarized sensing signal is deflected within the beamsplitter 15d in the horizontal-cross line direction into inertially isolated corner-cube retroreflector 29 (a first retroreflector for this embodiment). Retroreflector 29 reflects the signal back into the beamsplitter 15d where the signal is again deflected to form the first return sensing signal. In deflecting the second polarized sensing beam (twice), the signal is Doppler shifted as previously described with other embodiments of this specification. However, in this case, the Doppler shifted frequency components on the first return sensing signal represent horizontal-crossline and vertical motions due to the motions coupled to beamsplitter 15d. Inertially isolated retroreflector 29 does not Doppler shift the deflected signal, it only reflects the signal back to beamsplitter 15d.

The second polarized sensing signal passes through beamsplitter 15d and encounters seismically coupled retroreflector 24 (a second retroreflector for this embodiment) which is orientated with respect to the beamsplitter 15d on a vertical ordinate. Retroreflector 24 Doppler shifts the second polarized sensing signal to contain frequency components representing vertical motions and reflects the signal back into the beamsplitter 15d where it becomes a second return sensing signal.

This embodiment does not provide a Doppler shift for horizontal-inline motions because the horizontal-inline motions of beamsplitter 15c are perpendicular to the points of deflection of the signal within the beamsplitter; thus, there is no relative motion of the beamsplitter in the horizontal-inline direction with respect a deflected signal.

The first return sensing signal and the second return sensing signal are combined to form a return beam which enables both return sensing signals to travel through the same air space on the return trip to the receiver. In the receiver, the common mode frequency components on the return sensing signals will cancel (the vertical motion components) and a difference signal which represents horizontal-crossline motion will remain.

DIFFERENTIAL MODE LDI

The remote sensing system of this invention features a bipolarized, differential mode, LDI (laser differential interferometry) system. The term "bipolarized, differential mode LDI system" for the purposes of this specification represents a remote sensing system which receives from the target (remote detector) two transversely polarized return sensing signals, at least one of which has been Doppler shifted to contain frequency components which represent selected motions at a selected location; the return signals are then combined by various techniques (homodyne or heterodyne) to obtain a difference signal which represents desired (selected) ground motions at the remote location. In preferred embodiments of the invention, heterodyning is used to obtain a difference signal which provides indications of "up" and "down" Doppler motions.

The explanations of the embodiments of the following differential mode LDI system of this invention will be in accordance with obtaining a seismic signal which represents vertical motions of the ground using the embodiment of FIG. 3A with side window illumination. The use of other retroreflector embodiments or the use of top window illumination of the retroreflector embodiments will work equally well with the embodiments of the differential mode LDI system presented herein. The use of the designations of "horizontal", "vertical", "first" and "second" in reference to the signals in these explanations are for clarity. Other orientations for the signals to achieve the same results may be used. However, as mentioned previously, it is highly preferred that the polarities of the return sensing signals on the return beam be orthogonal with respect to each other.

In addition, the specific components identified on the simplified optical block diagrams in the FIGs of this specification may be changed to other optical components which provide the same function or combination of functions as shown in the figures to modulate optical signals in order to obtain electrical signals from the return sensing signals. Other optical components which may be used (but not limited to) in the transmission and receiver system or in the target of this invention are: Glan-Taylor polarizing prisms, Glan-Thompson polarizing prisms, Wollaston prisms, Beamsplitting Thompson prisms, beam displacing prisms, etc.

HETERODYNE DIFFERENTIAL MODE LDI SYSTEM WITH REFERENCE BEAMS

Figure 7:
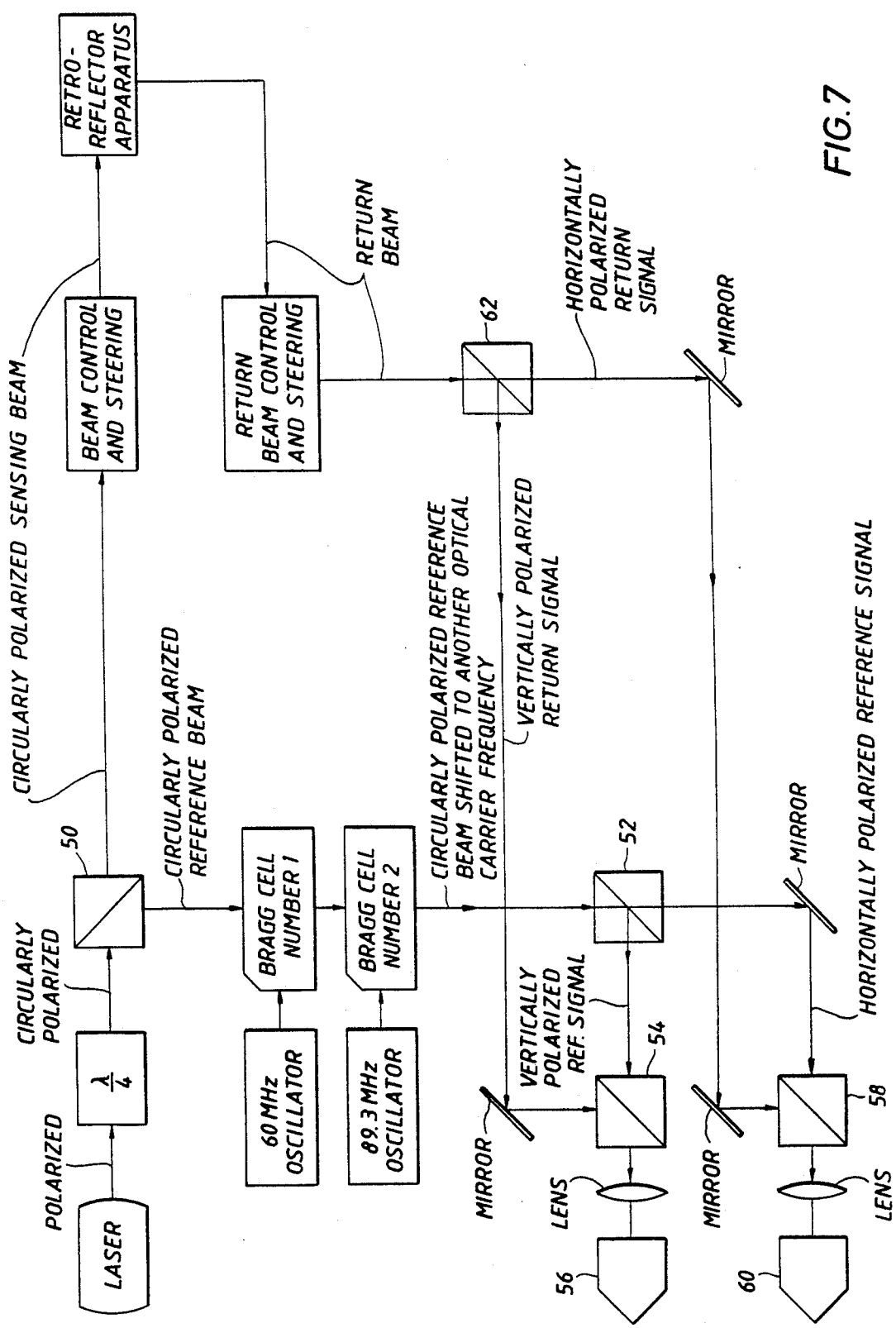
FIG. 7 is a simplified top view of an optical block diagram of the transmitting and receiving portion of one embodiment of a heterodyne laser differential mode interferometry (LDI) remote sensing system which transmits a circularly polarized sensing beam to the retroreflector apparatus, the sensing system having two photodetector channels and reference beams for heterodyning with the sensing beams.
Figure 8:
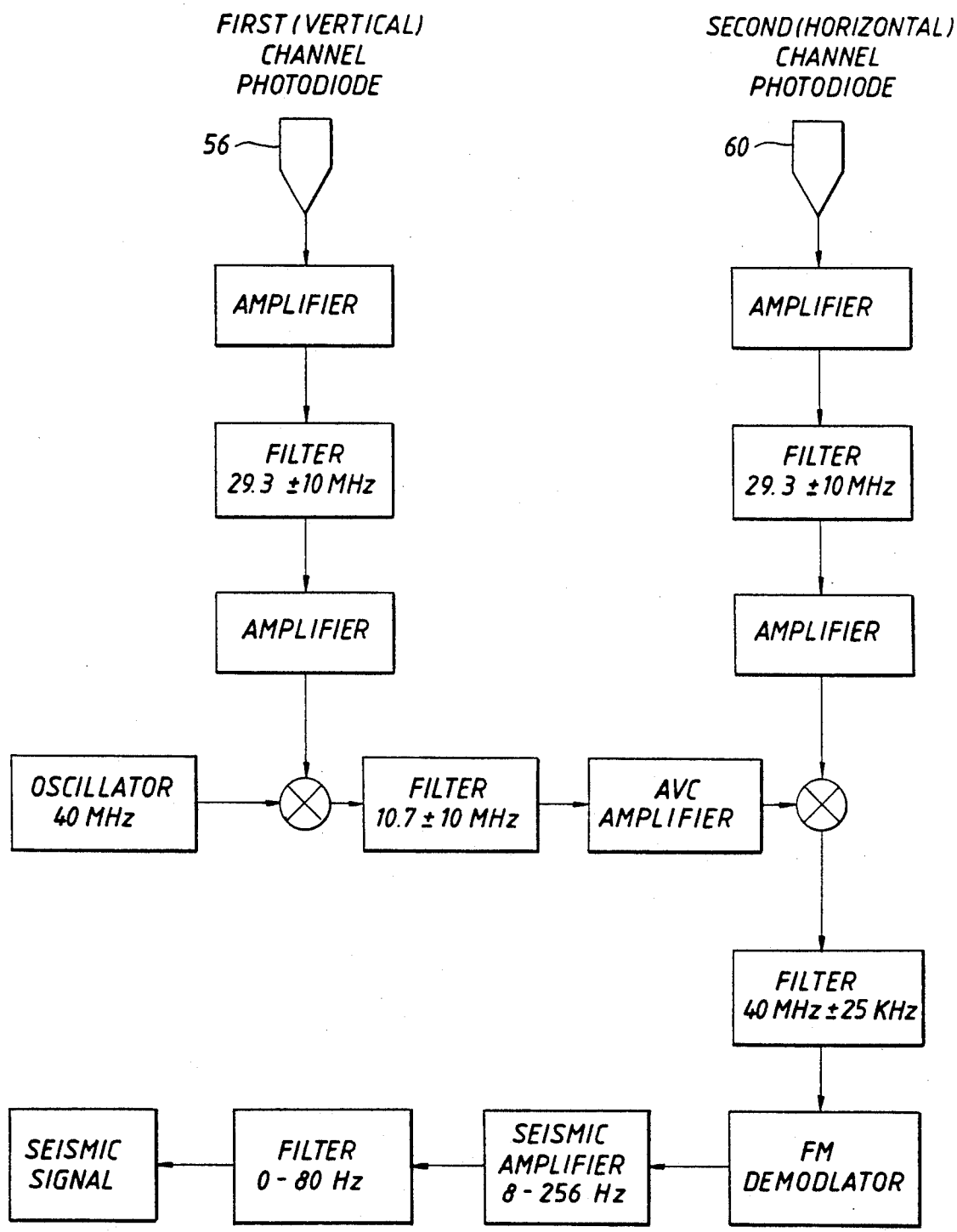
FIG. 8 is a block diagram of the electronic stages of the embodiment of the laser differential mode LDI of FIG. 7.

A preferred heterodyne embodiment of the remote sensing system of this invention, which transmits a circularly polarized sensing beam, is shown in FIG. 7. FIG. 7 is a simplified "top view" optical block diagram of a Differential mode LDI system which uses reference signals in an optical heterodyning process to reduce the carrier frequency of the return sensing signals so that any frequency modulated components on the return sensing signals may be processed electronically. FIG. 8 is a simplified block diagram of the electronic stages which may be used with the optical stages of the preferred embodiment of FIG. 7 to heterodyne and demodulate the electrical signals.

Referring to FIG. 7, a linearly polarized beam is produced by a laser. The beam is oriented with and passed through a quarter-wave plate such that it becomes circularly polarized.

The beam then encounters a nonpolarizing beamsplitter 50 that divides the circularly polarized beam into a forward circularly polarized beam and a deflected circularly polarized beam. The forward beam is now referred to herein as a sensing beam. The sensing beam then enters a beam control and steering system which directs the sensing beam to a retroreflector apparatus (target) of this invention. In some embodiments, a beam control and steering system may direct a plurality of transmitted beams to a plurality of retroreflector apparatus at different remote locations.

Returning to the nonpolarizing beamsplitter 50, the circularly polarized deflected beam will now be referred to herein as a reference beam. In this embodiment, the reference beam is frequency shifted by two cascaded Bragg cells. A Bragg cell is an acousto-optical modulator that shifts the impinging reference beam by the frequency of the applied oscillator signal. In this embodiment, the first Bragg cell shifts the reference beam by −60 MHz and the second Bragg cell shifts the reference beam by +89.3 MHz for a total frequency shift of +29.3 MHz.

It should be understood that the values of the frequencies provided in this discussion, as well as other frequencies discussed herein, are for an explanation of the particular embodiments described. Other frequencies may be used with these particular embodiments or similar embodiments of this invention.

After the second Bragg cell, the circularly polarized reference beam is split into two polarized signals, a first and a second reference signal, by a polarizing beamsplitter 52 (a first polarizing beamsplitter). The first reference signal will, in this explanation, be a vertically polarized reference signal and the second reference signal will be a horizontally polarized reference signal to correspond with the "top view" optical block diagram of FIG. 7. The polarizing beamsplitters 52 and 62 (a second polarizing beamsplitter) of FIG. 7 are oriented such that vertically polarized signals, which are split from the reference or return beam (to be discussed herein later), are deflected; thus, they are the polarized S-component for this orientation of polarizing beamsplitters. And, a horizontally polarized signal of either beam is the P-component for the orientation of these polarizing beamsplitters.

The first sensing signal (the vertically polarized signal) is deflected within polarizing beamsplitter 52 and directed into nonpolarizing beamsplitter 54 which also has the function of a beam combiner. Within this nonpolarizing beamsplitter 54, a portion of the first reference signal is again deflected. At the output of beamsplitter 54, the deflected portion of the first sensing signal beam is focused by a lens onto a first channel photodiode 56 (a vertical channel photodiode).

Returning to polarizing beamsplitter 52, the second reference signal (the horizontally polarized signal) passes through this polarizing beamsplitter 52. The second reference signal is then reflected off a mirror into nonpolarizing beamsplitter 58 which also acts as a beam combiner. A portion of the second reference signal passes through beamsplitter 58 without being deflected. At the output of the beamsplitter 58, the undeflected portion of the second reference signal is focused by a lens onto a second channel photodiode 60 (a horizontal channel photodiode).

The sensing beam, as discussed previously, is converted by the target into a return beam having two polarized return sensing signals, at least one of the return sensing signals having been frequency modulated to contain frequency components which represent selected ground motions at the selected location. The return beam is detected by the return beam control and steering system and passed to polarizing beamsplitter 62.

The return beam control and steering system and the sensing beam control and steering system in some embodiments could be integrated into a single system. As one system, a single (sensing and return) beam control and steering system could provide for directing and detecting a plurality of sensing beams and return beams. Beam control and steering as a single system or as separate systems may also be used to expand the sensing beams (beam spreading) for transmission and to compress the return beams upon detection. In addition, since the bipolarized dual corner-cube retroreflector of this invention returns the return beam approximately centered on the path of the sensing beam, a common component could be used in the sensing beam transmission path and the return beam reception path to automatically align the receiver with the transmitter. This component, in preferred embodiments, is a nonpolarizing beam splitter. When the sensing beam is transmitted, approximately half of the transmitted beam is deflected by the beamsplitter and does not reach the target. Similarly, about half of the return beam passes through the beamsplitter and is not used by the receiver. But, about half of the return beam is deflected into a polarizing beamsplitter such as shown on FIG. 7 as polarizing beamsplitter 62.

At polarizing beamsplitter 62, the return sensing signals are separated from the return beam to form two polarized signals, a first return signal and a second return signal. In this embodiment, the first return signal is vertically polarized and the second return signal is horizontally polarized. The first return signal is deflected by beamsplitter 62 into a mirror. The first return signal is then reflected off the mirror into nonpolarizing beamsplitter 54 where a portion of the first return signal is deflected into a lens. The lens focuses the deflected portion of the first return signal such that it is superimposed over the first reference signal on the first channel photodiode 56. Both of the superimposed signals on the photodiode 56 are vertically polarized.

The second return signal passes through beamsplitter 62 and it is reflected off a mirror into nonpolarizing beamsplitter 58. A portion of the second return signal is deflected by beamsplitter 58 into a lens. The lens focuses the deflected portion of the second return signal such that it is superimposed over the second reference signal on the second channel photodiode 60. Both of the superimposed signals on the second channel photodiode 60 are horizontally polarized.

At photodiodes (photodetectors) 56 and 60, a process known as optical heterodyning takes place to produce an electrical channel signal from each photodetector. The outputs of photodiodes 56 and 60 are radio frequency (RF) signals (product signals) whose strength is proportional to the intensity of the incident light (the reference and return signals). The desired product signal from each of the photodiodes 56, 60, of this embodiment of the invention has a carrier frequency which is the photodiode difference frequency between the reference signals and the return sensing signals. In this embodiment, the photodiode difference frequency is 29.3 MHz for the RF signal from each photodiode 56, 60. This is the frequency shift placed on the reference beam by the cascaded Bragg cells. The RF signal from each photodiode has the Doppler shifted frequency components of the detector (target 10a of FIG. 3A) centered on the carrier frequency of 29.3 MHz. The second photodiode 60 provides an RF signal which has the Doppler shifted frequency components produced by the target's frequency modulation of the first polarized sending signal (the horizontal polarized sensing signal); and, the first photodiode 56 provides an RF signal which has the Doppler shifted frequency components produced by the target's frequency modulation of the second polarized sensing signal (the vertical polarized sensing signal).

The cascaded Bragg cells are used in this embodiment to decrease the effects of an unwanted, contaminating signal. A small part (less than 0.1%) of the incident beam (the circularly polarized reference signal), still at the original laser frequency, leaks through the first Bragg cell. Without the second Bragg cell, the presence of this leakage beam may interfere with a return sensing signal at the photodetector because the polarized reference signal is usually considerably stronger than the return sensing signal. To understand this problem, consider the output of a photodetector caused by the contaminated reference beam. The leakage signal at the photodetector is still at the original laser frequency and will react with the Bragg cell's shifted reference beam frequency in the same way as the return sensing signal reacts with the Bragg cell's shifted frequency at the photodetector. The Bragg cell's shifted reference signal and the leakage signal will multiply and produce a product signal which is centered around the Bragg cell offset frequency. This RF signal has the same carrier frequency as the product signal produced at the photodetector by the mixing of the reference beam and the return sensing signal (the desired RF product signal). Consequently, the two RF frequencies will overlap. Since each RF carrier contains frequency components which may have the same frequencies, the two RF signals may interfere with each other. This may prevent obtaining an RF signal at the output of the photodetector which represents the Doppler shift frequency components at the remote location.

By using two Bragg cells in cascade, the contamination signal is placed further below the frequency of the desired signals at the photodetector. This occurs because the first-order contaminants (they leaked through only one cell and were shifted by the second Bragg cell) cause interfering signals in this embodiment at 89.3 MHz and 60 Mhz and as such, as will be described herein later, are not within the bandpass of the signal containing the Doppler shifted frequency components at the output of the photodetector and are filtered out. Only the second-order contamination, the light that leaked through both Bragg cells without being shifted, results in an interference signal centered at 29.3 MHz. The use of the second Bragg cell in this embodiment results in approximately a 30 dB reduction in the leakage signal interference with the desired product RF signal.

In other embodiments, a second Bragg cell may not be necessary, especially if the return sensing signal is considerably stronger at the photodetector than the leakage reference signal from a single Bragg cell.

Referring now to FIG. 8, it shows in block diagram form the electronic stages of an embodiment which may be used to combine the first (vertical) channel signal with the second (horizontal) channel signal of this differential mode LDI embodiment to obtain a signal which represents the vertical motions at a remote location. The RF signals from the output of the vertical channel photodiode and the horizontal channel photodiode are amplified, then enter filters. The filters are centered at 29.3 MHz and are broad enough to accommodate any frequency modulation due to laser frequency jitter, air turbulence, laser platform motion and ground motions at the remote location. In this embodiment, the filters have a bandpass of 10 MHz on each side of the center frequency. These filters eliminate the Bragg cell leakage signals at 89.3 MHz and 60 MHz. At the output of the filters the signals are again amplified.

The first (vertical) channel signal is then multiplied by a 40 MHz oscillator signal in another heterodyning stage. This multiplication causes signals at the sum (69.3 MHz) and difference (10.7 MHz) frequencies. The difference frequency (10.7 MHz) is allowed to pass through a filter which is centered at 10.7 MHz and has a bandpass in this embodiment of 10 MHz on each side of the center frequency. Note that the taking of the difference frequency resulted in a polarity reversal for the carrier frequency and the associated Doppler modulated components centered about the first (vertical) channel's carrier frequency. The resulting 10.7 MHz carrier signal out of the filter is amplified and then multiplied with the second (horizontal) channel output signal in an additional heterodyning stage to produce a sum signal. The second (horizontal) channel is still centered at 29.3; thus, the sum frequency of the first and second channel signals is 40 MHz for the sum signal.

In addition, because the polarity of the first (vertical) channel signal is reversed before being combined with the second (horizontal) channel signal, the sum signal will not include frequency components of the two signals which are substantially identical but of reverse polarity (the common mode signals in this stage), that is, the common mode signals are canceled electronically. Only the FM modulation from the target which represents the difference signal between the first and the second transversely polarized return sensing signals will remain centered on the 40 Mhz carrier. Any common modulation components (common mode signals) such as due to air turbulence, laser jitter, and in-line radar transmitter and detector motion are eliminated. Ideally, only the Doppler modulation resulting from the desired (selected) motions of the earth at the remote location remains on the 40 MHz carrier.

The sum signal is passed through a narrowband 40 MHz quartz filter with a bandpass of 25 kHz on each side of the center frequency. The largest seismic motions (motions of the earth) induced in exploration surveys are on the order of 1 cm/sec so the maximum Doppler shift at the higher conventional laser frequencies is around 30 kHz (Fdop=2 Vseis/Wavelength where Fdop is the Doppler shift, Vseis is the relative velocity at the remote location and Wavelength is the wavelength of the carrier frequency of the transmitted laser beam). Accordingly, the quartz filter is used in this embodiment to sharply limit the bandwidth and thereby remove additive noise before the FM demodulator. In other embodiments, a filter with a broader bandwidth may be used The FM demodulator converts the desired Doppler shifted signal (the difference signal) about the center frequency of the sum signal to a time varying signal (amplitude modulated signal) which represents the velocity of the ground motions at the remote location. The demodulated signal is then amplified with a constant gain over the frequency range of 8-256 Hz. It may then pass through a low pass filter with a frequency range of 0-80 Hz to produce the seismic signal which represents the velocities of the desired ground motions at the remote location, which in this case are the vertical ground motions.

Again, the bandwidths, the center frequencies of the filters used and the heterodyning frequencies used in this explanation may be changed in this or the other embodiment shown to other frequencies to achieve similar results. In addition, some amplification stages may be eliminated or moved to other stages in the FM demodulation process.

HETERODYNE DIFFERENTIAL MODE LDI WITH ONE PHOTODETECTOR CHANNEL

Figures 9, 10:
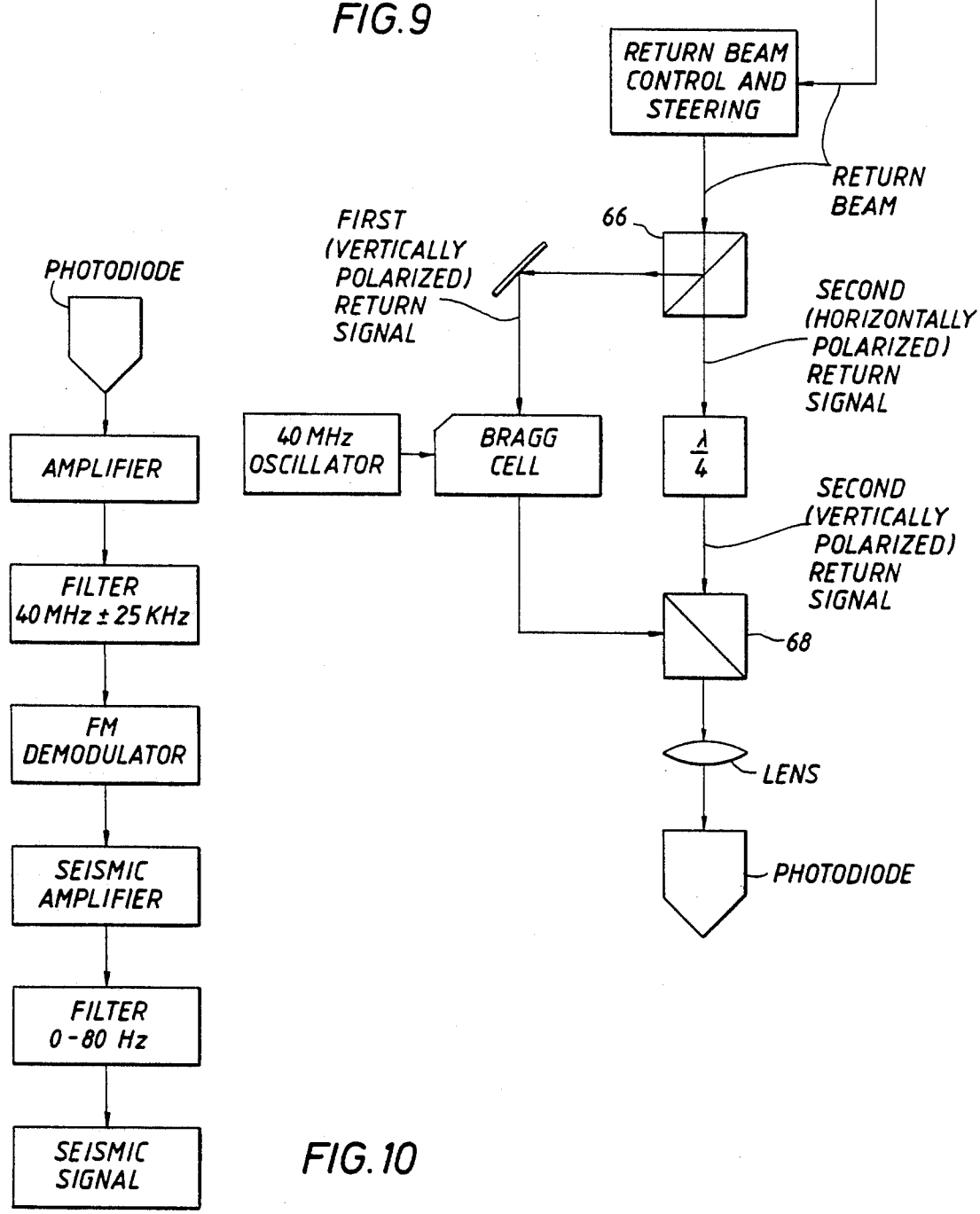
FIG. 9 is a simplified top view of an optical block diagram of the transmitting and detecting portion of one embodiment of a heterodyne differential mode interferometry (LDI) remote sensing system which uses a single photodetector.
FIG. 10 is a block diagram of the electronic stages of the embodiment of the laser Doppler radar remote sensing system of FIG. 9.

Referring now to FIG. 9, another heterodyne embodiment of the present invention is provided. FIG. 9 shows a simplified "top view" optical block diagram of a differential mode LDI remote sensing system which does not use reference signals in the optical heterodyning process and has a single photodetector channel. As described previously in a preferred embodiment, a single laser may be used to provide a linearly polarized beam which is shifted by a quarter-wave plate to obtain a circularly polarized sensing beam. The sensing beam may then be directed by a beam steering and control system to illuminate a retroreflector apparatus (target).

The return beam containing the return sensing signals is detected by the return beam control and steering system. The return beam is then passed to polarizing beamsplitter 66 which separates the return beam into a first return signal (a vertically polarized signal) and a second return signal (a horizontally polarized signal). The beamsplitter 66 in this orientation deflects the first return signal; thus, the vertical polarized first return signal for this configuration is the S-component of the return beam and the second return signal (the horizontally polarized return signal) is the P-component. The first return signal is deflected by polarizing beamsplitter 66 into a mirror. The mirror directs the first return signal into a Bragg cell.

In this embodiment, since the second return signal is not substantially stronger than the first return signal, the use of cascaded Bragg cells may not be necessary to reduce the Bragg cell leakage signal. The Bragg cell oscillator shifts the frequency of the impinging first return signal by 40 MHz. The frequency shifted first return signal is then reflected off a mirror into nonpolarizing beamsplitter 68 which also acts as a beam combiner. A portion of the frequency shifted first return signal is deflected by the nonpolarizing beamsplitter 68 into a lens. The deflected portion of the first return signal is focused by the lens onto a photodiode.

Referring again to polarizing beamsplitter 66, the second return signal passes through the polarizing beamsplitter 66 and enters a quarter-wave plate. The quarter-wave plate changes the polarity of the second return signal from horizontal polarization to vertical polarization. A portion of the second return signal then passes through nonpolarizing beamsplitter 68 (acting as a beam combiner) into the lens. The lens focuses the second return signal such that it overlaps the frequency shifted first return signal on the photodiode.

Both of the signals on the photodiode (photodetector) are now vertically polarized so optical heterodyning may take place at the photodiode. The output of the photodiode is a plurality of radio frequency (RF) signals (product signals) whose strength is proportional to the intensity of the incident light (the two return signals). The desired product signal from the photodiode of this embodiment has a carrier frequency which is the difference frequency between the second return signal and the frequency shifted first return signal. In this embodiment, the photodiode difference frequency is 40 MHz for the RF signal from the photodiode. This is the frequency shift placed on the first return signal by the Bragg cell. The RF signal from the photodiode has the desired Doppler shifted frequency components centered about the carrier frequency of 40 MHz. The changing of the polarity of the second return signal by the quarter-wave plate into a vertically polarized signal enabled optical heterodyning to take place so that the common modulation components (common mode signals) of the two sensing signals would cancel in the photodetector; thus, common modulation components, such as, atmospheric turbulence, laser jitter, and in-line radar transmitter and detector motion, are eliminated at the photodetector in this embodiment.

FIG. 10 is a block diagram of the electronic stages of an embodiment which may be used in obtaining a seismic signal for the RF signal produced by the photodetector of FIG. 9. The RF signal is amplified, then passed thorough a 40 MHz filter with a bandpass of 25 kHz on each side of the center frequency of the filter. The signal is then FM demodulated to provide a time varying signal representative of the velocity of the desired ground motions at the remote location. This signal may then be amplified and filtered to provide a seismic trace, which in this example is a seismic signal which represents vertical motions of the earth.

EXAMPLE OF SEISMIC SIGNALS OBTAINED BY THIS INVENTION

Figure 11A:
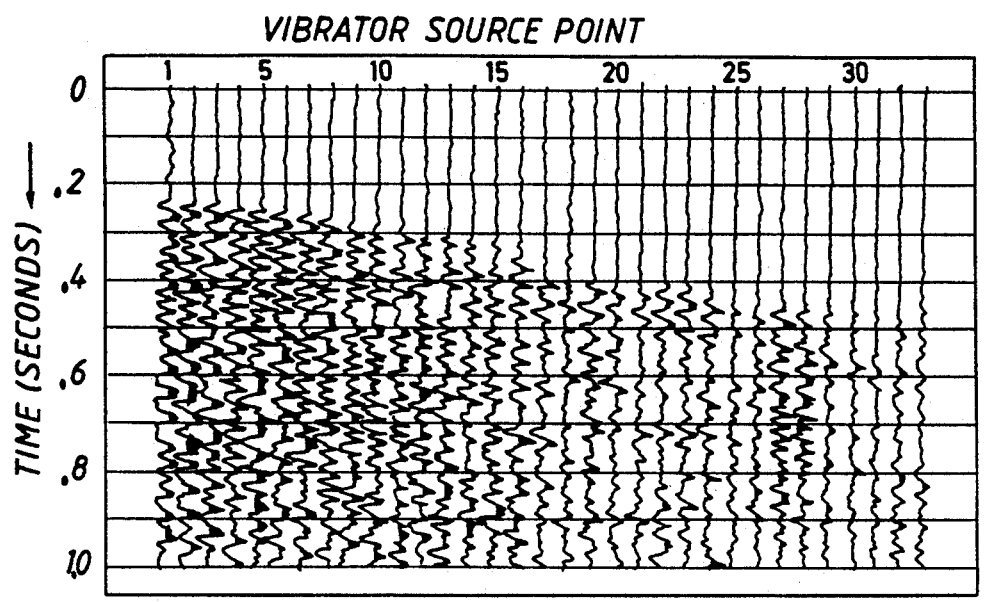
FIG. 11A is a common receiver point panel of seismic traces obtained with an embodiment of this invention.
Figure 11B:
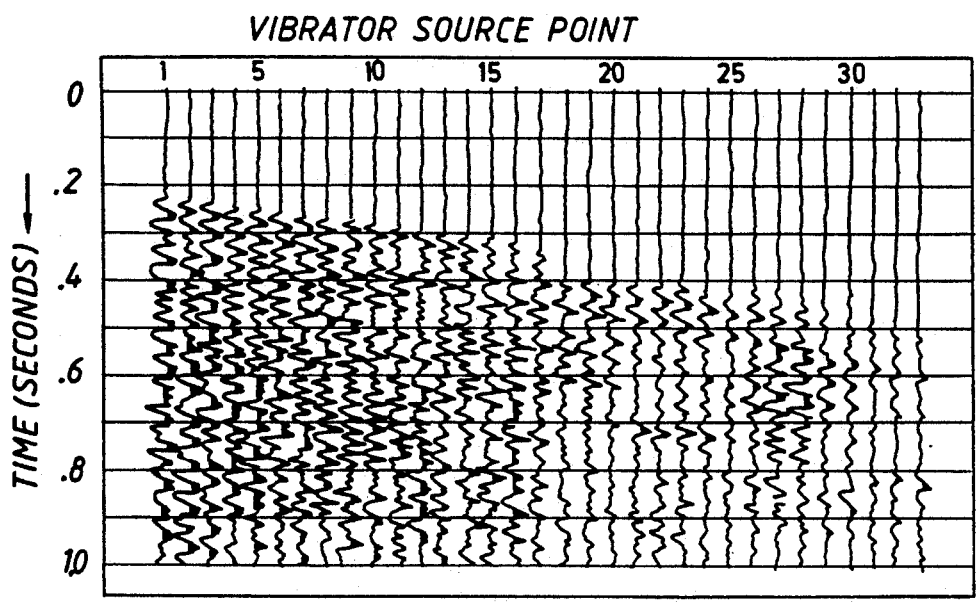
FIG. 11B is a common receiver point panel of seismic traces obtained with a conventional geophone located less than a meter from the retroreflector apparatus used to detect the seismic traces of FIG. 11A.

FIG. 11A is a panel of common receiver point seismic traces obtained by the use of an embodiment of the remote seismic sensing system of this invention. The bipolarized, differential mode, LDI remote system embodiment used to obtain these traces is depicted in FIGS. 7 and 8. The retrophone (target) embodiment is depicted in FIG. 3A. A circularly polarized visible light laser was used for the sensing beam. These traces represent vertical ground motions obtained with the retroreflector apparatus located 200 meters from the transmission and detection system of this invention. FIG. 11b is a panel of common receiver point seismic traces obtained with a conventional geophone planted less than one meter from the retroreflector apparatus. The vibrator source point spacing was 30 meters, so these common receiver point panels (FIGS. 11A and 11B) span approximately 1000 meters.

While several embodiments of the invention have been shown and described, it will be understood that the invention is not limited thereto since many modifications may be made and will become apparent to those of skill in the art.

What is claimed is:

1. A remote detector apparatus for use with a bipolarized, differential mode, laser differential interferometry, remote sensing system, the remote sensing system having a receiver which is adapted to combine two return sensing signals from said remote detector apparatus in a process to obtain a difference signal which represents selected motions at a selected location and to cancel common mode signals on the return sensing signals, said remote detector apparatus being located at the selected location and adapted to detect the selected motions, said remote detection apparatus also being adapted to enable the remote sensing system to reduce turbulent noise on the resulting difference signal by providing for the turbulent noise to be common mode signals, the turbulent noise being caused by atmospheric effects between the receiver and said remote detector apparatus, the remote detector apparatus comprising:

a casing, the casing being functional to couple to motions at the selected location, the motions having directions of movements in any of three orthogonal directions at the selected location, the motions including the selected motions; and a means mounted on the casing which is functional for converting a single sensing beam of substantially monochromatic frequency into a single return beam having two overlapping transversely polarized return sensing signals which contain between them the difference signal which represents the selected motions at the selected location, said means providing for (1) splitting the sensing beam into two signals, (2) deflecting one signal of the signals, (3) frequency modulating the deflected signal with the selected motions on the casing thereby Doppler shifting the deflected signal to contain Doppler shifted frequency components that represent the selected motions, (4) polarizing both of the signals such that the signals are transformed into polarized sensing signals having polarities transverse with respect to each other, (5) combining the polarized sensing signals, one of which contains the Doppler shifted frequency components representing the selected motions, into the return beam having overlapping transversely polarized return sensing signals, and (6) directing the return beam to a return propagation path which takes the return beam to the receiver, wherein the two overlapping transversely polarized return sensing signals of the return beam occupy substantially the same air space on the return propagation path, thus the atmospheric effects on the sensing beam and the overlapping return sensing signals result in turbulent noise on the single sensing beam and the single return beam which are common mode signals to both said return sensing signals, the common mode signals being canceled in the receiver thereby reducing the effects of turbulent noise on the resulting difference signal.

2. The remote detector apparatus of claim 1, wherein the means for converting the single sensing beam into the single return beam includes:

a beamsplitter rigidly attached to the casing, the beamsplitter being functional (a) to split the sensing beam into a first sensing signal and a second sensing signal, (b) to deflect the first sensing signal into a different path than the path of the second sensing signal, and (c) to modulate the deflected first sensing signal with certain motions coupled to the beamsplitter through the casing by Doppler shifting the first sensing signal to contain a first grouping of frequency components which represent the certain motions coupled to the beamsplitter through the casing, the certain motions including the selected motions;

polarizers, said polarizers being functional to provide a first polarized signal from the first sensing signal and a second polarized signal from the second sensing signal, the polarizers having been aligned with respect to each other such that the first polarized signal has a polarity which is orthogonal to the polarity of the second polarized signal;

a first retroreflector, the first retroreflector is attached to the casing such that it is aligned with the deflected first sensing signal and it is inertially isolated from the motions coupled to the casing which move in a direction that corresponds to the deflected path of the first sensing signal, the first retroreflector being functional to reflect the first polarized signal back into the beamsplitter;

a second retroreflector, the second retroreflector is rigidly attached to the casing and aligned with the second sensing signal, the second retroreflector being functional (a) to reflect the second polarized signal back into the beamsplitter and (b) to modulate the second polarized signal by Doppler shifting the second polarized signal to contain frequency components which represent particular motions coupled to the casing;

the beamsplitter also being functional to provide a first return sensing signal from a portion of the reflected first polarized signal when the signal returns to the beamsplitter (a) by splitting said portion from the reflected first polarized signal and (b) by deflecting and (c) modulating said portion with the certain motions on the beamsplitter so that the first return sensing signal formed by the beamsplitter from said portion has (a) a direction of propagation opposite to the sensing beam, (b) a first return propagation path centered approximately on the sensing beam's incident path into the beamsplitter, and (c) a group of frequency components, whereby the group of frequency components is formed by the beamsplitter Doppler shifting the first grouping of frequency components of said portion into the group of frequency components, the group of frequency components representing the cumulative motions of the certain motions coupled to the beamsplitter; and the beamsplitter, in addition, being functional to provide a second return sensing signal when the reflected second polarized signal returns to the beamsplitter by splitting the reflected second polarized signal into a deflected second polarized signal and a second return sensing signal, the second return sensing signal having a second return propagation path which is the same as the first return propagation path, whereby the first return sensing signal and the second return sensing signal are combined in the beamsplitter to form the return beam.

3. The remote detector apparatus according to claim 2, wherein:

the beamsplitter is aligned with the propagation path of the sensing beam, such that, when the beamsplitter is illuminated by the sensing beam, the path of the first sensing signal is deflected so that its deflected path is approximately perpendicular to the path of the second sensing signal, the certain motions coupled to the beamsplitter through the casing which Doppler shift the first polarized sensing signal have directions of movements which correspond to two orthogonal directions, the two directions corresponding to motions which are inline with the deflected path of the first sensing signal and motions which are inline with the path of the second sensing signal, and the selected motions coupled to the beamsplitter have directions of movement which correspond to motions that are inline with the deflected path of the first sensing signal; and the particular motions coupled to the second retroreflector have directions of movement which correspond to motions inline with the path of the second sensing signal, whereby both said return sensing signals have common frequency components which were produced by motions on the casing having directions of motion which correspond to the inline path of the second sensing signal, the common frequency components on both said signals being common mode signals, whereby the receiver cancels these common mode signals as well as the common mode signals contributed by the atmospheric effects to provide the difference signal which represents the motions inline with the deflected path of the first sensing signal.

4. The remote detector apparatus according to claim 3, wherein:

the first retroreflector is a corner-cube retroreflector; and the second retroreflector is a corner-cube retroreflector.

5. The remote detector apparatus according to claim 4, wherein:

the beamsplitter is a wire grid polarizer; and the polarizers are wire grid polarizers.

6. The remote detector apparatus according to claim 4, wherein the motions coupled to the casing are ground motions.

7. The remote detector apparatus according to claim 4, also including:

a side window on the casing;

wherein, the beamsplitter is also aligned with respect to the side window so that when the beamsplitter is illuminated through the side window by the sensing beam, the beamsplitter is functional to deflect the first sensing signal in a vertical direction such that the deflected path of this signal is along a vertical ordinate and the path of the second sensing signal is along a horizontal-inline ordinate, the certain motions coupled to the beamsplitter have directions of movements which correspond to motions inline with the vertical and horizontal-inline direction, and the selected motions coupled to the beamsplitter have directions of movement which correspond to motions inline with the vertical direction;

wherein, the first retroreflector is inertially isolated from motions in the vertical direction; and wherein, the particular motions coupled to the second retroreflector have directions of movement which corresponds to motions inline with the horizontal-inline direction.

8. The remote detector apparatus according to claim 4, also including:

a side window on the casing;

wherein, the beamsplitter is also aligned with respect to the side window so that when the beamsplitter is illuminated through the side window by the sensing beam, the beamsplitter is functional to deflect the first sensing signal in a horizontal-crossline direction such that the deflected path of this signal is along a horizontal-crossline ordinate and the path of the second sensing signal is along a horizontal-inline ordinate, the certain motions coupled to the beamsplitter have directions of movements which correspond to motions inline with the horizontal-crossline and horizontal-inline directions, and the selected motions coupled to the beamsplitter have directions of movement which correspond to motions inline with the horizontal-crossline direction;

wherein, the first retroreflector is inertially isolated from motions inline with the horizontal-crossline direction; and wherein, the particular motions coupled to the second retroreflector have directions of movement which correspond to motions inline with the horizontal-inline direction.

9. The remote detector apparatus according to claim 4, also including:

a top window on the casing;

wherein, the beamsplitter is also aligned with respect to the top window so that when the beamsplitter is illuminated through the top window by the sensing beam, the beamsplitter is functional to deflect the first sensing signal in a horizontal-inline direction such that the deflected path of this signal is along a horizontal-inline ordinate and the path of the second sensing signal is along a vertical ordinate, the certain motions coupled to the beamsplitter have directions of movements which correspond to motions inline with the horizontal-inline and vertical directions, and the selected motions coupled to the beamsplitter have directions of movements which correspond to motions inline with the horizontal-inline direction;

wherein, the first retroreflector is inertially isolated from motions inline with the horizontal-inline direction; and wherein, the particular motions coupled to the second retroreflector have directions of movement which correspond to motions inline with the vertical direction.

10. The remote detector apparatus according to claim 4, also including:

a top window on the casing;

wherein, the beamsplitter is also aligned with respect to the top window so that when the beamsplitter is illuminated through the top window by the sensing beam, the beamsplitter is functional to deflect the first sensing signal in a horizontal-crossline direction such that the deflected path is along a horizontal-crossline ordinate and the path of the second sensing signal is along a vertical ordinate, the certain motions coupled to the beamsplitter have directions of movements which correspond to motions inline with the horizontal-crossline and vertical directions, and the selected motions coupled to the beamsplitter have directions of movement which correspond to motions inline with the horizontal-crossline direction;

wherein, the first retroreflector is inertially isolated from motions inline with the horizontal-crossline direction; and wherein, the particular motions coupled to the second retroreflector have directions of movement which correspond to motions inline with the vertical direction.

11. The remote detector apparatus in accordance with claim 1, wherein the means for converting the single sensing beam into a single return beam includes:

a beamsplitter rigidly attached to the casing, the beamsplitter being functional (a) to split the sensing beam into a first sensing signal and a second sensing signal, (b) to deflect the first sensing signal into a different path than the path of the second sensing signal, and (c) to modulate the deflected first sensing signal with certain motions coupled to the beamsplitter through the casing by Doppler shifting the first sensing signal to contain a first grouping of frequency components which represent the certain motions coupled to the beamsplitter through the casing, the certain motions including the selected motions;

polarizers, said polarizers being functional to provide a first polarized signal from the first sensing signal and a second polarized signal from the second sensing signal, the polarizers having been aligned with respect to each other such that the first polarized signal has a polarity which is orthogonal to the polarity of the second polarized signal;

a first retroreflector, the first retroreflector is rigidly attached to the casing and aligned with the deflected first sensing signal, the first retroreflector being functional to reflect the first polarized signal back into the beamsplitter and to modulate the first polarized signal by Doppler shifting the first grouping of frequency components into a second grouping of frequency components, the second grouping of frequency components including the Doppler shifts contributed by particular motions coupled to the first retroreflector through the casing;

a second retroreflector, the second retroreflector is attached to the casing such that it is aligned with the second sensing signal and it is inertially isolated from the motions coupled to the casing which move in an inline direction that corresponds to the path of the second sensing signal, the second retroreflector being functional to reflect the second polarized signal back into the beamsplitter;

the beamsplitter also being functional to provide a first return sensing signal from a portion of the reflected first polarized signal when the signal returns to the beamsplitter by (a) splitting said portion from the reflected first polarized signal and by (b) deflecting and (c) modulating said portion with the certain motions coupled to the beamsplitter so that the first return sensing signal formed by the beamsplitter from said portion has (a) a direction of propagation opposite to the sensing beam, (b) a first return propagation path centered approximately on the sensing beam's incident path into the beamsplitter, and (c) a group of frequency components, whereby the group of frequency components is formed by the beamsplitter Doppler shifting the second grouping of frequency components of said portion into the group of frequency components, the Doppler shifted frequency components contributed by the particular motions being canceled such that the group of frequency components only represents the cumulative selected motions coupled to the beamsplitter through the casing; and the beamsplitter, in addition, being functional to provide a second return sensing signal when the reflected second polarized signal returns to the beamsplitter by splitting the reflected second polarized signal into a deflected second polarized signal and a second return sensing signal, the second return sensing signal having a second return propagation path which is the same as the first return propagation path, whereby the first return sensing signal and the second return sensing signal are combined in the beamsplitter to form the return beam.

12. The remote detector apparatus according to claim 11, wherein:

the beamsplitter is aligned with the propagation path of the sensing beam, such that, when the beamsplitter is illuminated by the sensing beam, the path of the first sensing signal is deflected so that its deflected path is approximately perpendicular to the path of the second sensing signal, the certain motions coupled to the beamsplitter through the casing have directions of movements which correspond to two orthogonal directions, the two directions corresponding to motions which are inline with the deflected path of the first sensing signal and motions which are inline with the path of the second sensing signal, and the selected motions coupled to the beamsplitter have directions of movement which correspond to motions which are inline with the path of the second sensing signal; and the particular motions coupled to the first retroreflector have directions of movement which correspond to motions inline with the deflected path of the first sensing signal, and the common mode signals contributed by the atmospheric effects are canceled in the receiver to provide the difference signal which represents the motions inline with the path of the second sensing signal.

13. The remote detector apparatus according to claim 12, wherein:

the first retroreflector is a corner-cube retroreflector; and the second retroreflector is a corner-cube retroreflector.

14. The remote detector apparatus according to claim 13, wherein:

the beamsplitter is a wire grid polarizer; and the polarizers are wire grid polarizers.

15. The remote detector apparatus according to claim 13, wherein the motions coupled to the casing are ground motions.

16. The remote detector apparatus according to claim 13, also including:

a top window on the casing;

wherein, the beamsplitter is also aligned with respect to the top window so that when the beamsplitter is illuminated through the top window by the sensing beam, the beamsplitter is functional to deflect the first sensing signal in a horizontal-inline direction such that the deflected path of the signal is along a horizontal-inline ordinate and the path of the second sensing signal is along a vertical ordinate, the certain motions coupled to the beamsplitter have directions of movements which correspond to motions inline with the horizontal-inline and vertical directions, and the selected motions coupled to the beamsplitter have directions of movement which correspond to motions inline with the vertical direction;

wherein, the particular motions coupled to the first retroreflector have directions of movement which correspond to motions inline with the horizontal-inline directional; and wherein, the second retroreflector is inertially isolated from motions having directions of movement inline with the vertical direction.

17. The remote detector apparatus according to claim 13, also including:

a side window on the casing;

wherein, the beamsplitter is also aligned with respect to the side window so that when the beamsplitter is illuminated through the side window by the sensing beam, the beamsplitter is functional to deflect the first sensing signal in a vertical direction such that the deflected path is along a vertical ordinate and the path of the second sensing signal is along a horizontal-inline ordinate, the certain motions coupled to the beamsplitter have directions of movements which correspond to motions inline with the vertical and horizontal-inline directions, and the selected motions coupled to the beamsplitter have directions of movement which correspond to motions in the horizontal-inline direction;

wherein, the particular motions coupled to the first retroreflector have directions of movement which correspond to motions inline with the vertical direction; and wherein, the second retroreflector is inertially isolated from motions having directions of movement inline with the horizontal-inline direction.

18. The remote detector apparatus in accordance with claim 1, wherein the means for converting the sensing beam into a single return beam includes:

a polarizing beamsplitter rigidly attached to the casing, the polarizing beamsplitter being functional (a) to split the sensing beam into a first polarized sensing signal and a second polarized sensing signal, (b) to deflect the first polarized sensing signal into a different path than the path of the second polarized sensing signal, and (c) to modulate the deflected first polarized sensing signal with certain motions coupled to the beamsplitter from the casing by Doppler shifting the first polarized sensing signal to contain a first grouping of frequency components which represent the certain motions coupled to the polarizing beamsplitter through the casing, the certain motions including the selected motions, the first polarized sensing signal having a polarity which is orthogonal to the polarity of the second polarized sensing signal;

a first retroreflector, the first retroreflector is attached to the casing such that it is aligned with the deflected first polarized sensing signal and it is inertially isolated from motions coupled to the casing which move in an inline direction that corresponds to the deflected path of the first polarized sensing signal, the first retroreflector being functional to reflect the first polarized sensing signal back into the beamsplitter;

a second retroreflector, the second retroreflector is rigidly attached to the casing and aligned with the second polarized sensing signal, the second retroreflector being functional to reflect the second polarized sensing signal back into the polarizing beamsplitter and to modulate the second polarized sensing signal by Doppler shifting the second polarized sensing signal to contain frequency components which represent particular motions coupled to the casing, the reflected second polarized signal being a second return sensing signal having a second return propagation path when it returns within the polarizing beamsplitter;

the polarizing beamsplitter also being functional to provide a first return sensing signal from the reflected first polarized sensing signal when the signal returns to the polarizing beamsplitter (a) by deflecting and (b) modulating said reflected signal with the certain motions coupled to the beamsplitter so that the first return sensing signal formed by the polarizing beamsplitter from said reflected signal has a (a) direction of propagation opposite to the sensing beam and (b) a first return propagation path centered approximately on the sensing beam's incident path into the beamsplitter, the first return propagation path being the same as the second return propagation path, the first return sensing signal also has (c) a group of frequency components, whereby the group of frequency components is formed by the beamsplitter Doppler shifting the first grouping of frequency components of said first reflected signal into the group of frequency components, the group of frequency components representing the cumulative motions of the certain motions coupled to the beamsplitter; and the polarizing beamsplitter, in addition, being functional to combine the first return sensing signal with the second return sensing signal to form the return beam.

19. The remote detector apparatus according to claim 18, wherein:

the polarizing beamsplitter is aligned with the propagation path of the sensing beam, such that, when the polarizing beamsplitter is illuminated by the sensing beam, the path of the first polarized sensing signal is deflected so that its deflected path is approximately perpendicular to the path of the second polarized sensing signal, the certain motions coupled to the polarizing beamsplitter through the casing which Doppler shift the polarized sensing signal have directions of movements which correspond to two orthogonal directions, the two directions corresponding to motions which are inline with the deflected path of the first polarized sensing signal and motions which are inline with the path of the second polarized sensing signal, and the selected motions coupled to the beamsplitter have directions of movement which correspond to motions inline with the deflected path of the first sensing signal; and the particular motions coupled to the second retroreflector have directions of movement which correspond to motions inline with the path of the second sensing signal, whereby both said return sensing signals have frequency components which were produced by motions on the casing having directions of motion which correspond to the inline path of the second sensing signal, the common frequency components on both said signals being common mode signals, whereby the receiver cancels these common mode signals as well as the common mode signals contributed by the atmospheric effects to provide the difference signal which represents the motions inline with the deflected path of the first sensing signal.

20. The remote detector apparatus according to claim 19, wherein:

the first retroreflector is a corner-cube retroreflector; and the second retroreflector is a corner-cube retroreflector.

21. The remote detector apparatus according to claim 20, wherein the motions coupled to the casing are ground motions.

22. The remote detector apparatus according to claim 20, also including:

a side window on the casing;

wherein, the polarizing beamsplitter is also aligned with respect to the side window so that when the polarizing beamsplitter is illuminated through the side window by the sensing beam, the polarizing beamsplitter is functional to deflect the first polarized sensing signal in a vertical direction such that the deflected path of this signal is along a vertical ordinate and the path of the second polarized sensing signal is along a horizontal-inline ordinate, the certain motions coupled to the beamsplitter have directions of movements which correspond to motion inline with the vertical and horizontal-inline directions, and the selected motions coupled to the beamsplitter have directions of movement which correspond to motions inline with the vertical direction;

wherein, the first retroreflector is inertially isolated from motions inline with the vertical direction; and wherein, the particular motions coupled to the second retroreflector have directions of movement which correspond to motions inline with the horizontal-inline direction.

23. The remote detector apparatus according to claim 20, also including:

a side window on the casing;

wherein, the polarizing beamsplitter is also aligned with respect to the side window so that when the polarizing beamsplitter is illuminated through the side window by the sensing beam, the polarizing beamsplitter is functional to deflect the first polarized sensing signal in a horizontal-crossline direction such that the deflected path of this signal is along a horizontal-crossline ordinate and the path of the second polarized sensing signal is along a horizontal-inline ordinate, the certain motions coupled to the beamsplitter have directions of movement corresponding to motion inline with the horizontal-crossline and horizontal-inline directions, and the selected motions coupled to the beamsplitter have directions of movement which correspond to motions inline with the horizontal-crossline direction;

wherein, the first retroreflector is inertially isolated from motions inline with the horizontal-crossline direction; and wherein, the particular motions coupled to the second retroreflector have directions of movement which correspond to motions inline with the horizontal-inline direction.

24. The remote detector apparatus according to claim 20, also including:

a top window on the casing;

wherein, the polarizing beamsplitter is also aligned with respect to the top window so that when the polarizing beamsplitter is illuminated through the top window by the sensing beam, the polarizing beamsplitter is functional to deflect the first polarized sensing signal in a horizontal-inline direction such that the deflected path of this signal is along a horizontal-inline ordinate and the path of the second polarized sensing signal is along a vertical ordinate, the certain motions coupled to the beamsplitter have directions of movements which correspond to motions inline with the horizontal-inline and vertical directions, and the selected motions coupled to the beamsplitter have directions of movement which correspond to motions inline with the horizontal-inline direction;

wherein, the first retroreflector is inertially isolated from motions inline with the horizontal-inline direction; and wherein, the particular motions coupled to the second retroreflector have directions of movement which correspond to motion inline with the vertical direction.

25. The remote detector apparatus according to claim 20, also including:

a top window on the casing;

wherein, the polarizing beamsplitter is also aligned with respect to the top window so that when the polarizing beamsplitter is illuminated through the top window by the sensing beam, the polarizing beamsplitter is functional to deflect the first polarized sensing signal in a horizontal-crossline direction such that the deflected path is along a horizontal-crossline ordinate and the path of the second polarized sensing signal is along a vertical ordinate, the certain motions coupled to the beamsplitter have directions of movements which correspond to motions inline with the horizontal-crossline and vertical directions, and the selected motions coupled to the beamsplitter have directions of movement which correspond to motions inline with the horizontal-crossline direction;

wherein, the first retroreflector is inertially isolated from motions inline with the horizontal-crossline direction; and wherein, the particular motions coupled to the second retroreflector have directions of movement which correspond to motions inline with the vertical direction.

26. The remote detector apparatus in accordance with claim 1, wherein the means for converting the singe sensing beam into a single return beam includes:

a polarizing beamsplitter rigidly attached to the casing, the polarizing beamsplitter being functional (a) to split the sensing beam into a first polarized sensing signal and a second polarized sensing signal, (b) to deflect the first polarized sensing signal into a different path than the path of the second polarized sensing signal, and (c) to modulate the deflected first polarized sensing signal with certain motions coupled to the beamsplitter from the casing by Doppler shifting the first polarized sensing signal to contain a first grouping of frequency components which represent the certain motions coupled to the polarizing beamsplitter through the casing, the certain motions including the selected motions, the first polarized sensing signal having a polarity which is orthogonal to the polarity of the second polarized sensing signal;

a first retroreflector, the first retroreflector is rigidly attached to the casing and aligned with the deflected first polarized sensing signal, the first retroreflector being functional to reflect the first polarized sensing signal back into the beamsplitter and to modulate the first polarized signal by Doppler shifting the first grouping of frequency components into a second grouping of frequency components, the second grouping of frequency components including the Doppler shifts contributed by particular motions coupled to the first retroreflector through the casing;

a second retroreflector, the second retroreflector is attached to the casing such that it is aligned with the second polarized sensing signal and it is inertially isolated from motions coupled to the casing which move in an inline direction that correspond to the path of the second polarized sensing signal, the second retroreflector being functional to reflect the second polarized sensing signal back into the beamsplitter, the reflected second polarized sensing signal being a second return sensing signal having a second return propagation path when the reflected signal returns within the polarizing beamsplitter;

the polarizing beamsplitter also being functional to provide a first return sensing signal from the reflected first polarized sensing signal when the signal returns to the polarizing beamsplitter (a) deflecting and (b) modulating said reflected signal with the certain motions coupled to the beamsplitter so that the first return sensing signal formed by the polarizing beamsplitter from said reflected signal has (a) a direction of propagation opposite to the sensing beam and (b) a first return propagation path centered approximately on the sensing beam's incident path into the polarizing beamsplitter, the first return propagation path being the same as the second propagation path, the first return sensing signal also has (c) a group of frequency components, whereby the group of frequency components is formed by the beamsplitter Doppler shifting the second grouping of frequency components of said first reflected signal into the group of frequency components, the Doppler shifted frequency components contributed by the particular motions being canceled such that the group of frequency components only represents the cumulative selected motions coupled to the beamsplitter through the casing; and the polarizing beamsplitter, in addition, being functional to combine the first return sensing signal with the second return sensing signal to form the return beam.

27. The remote detector apparatus according to claim 26, wherein:

the polarizing beamsplitter is aligned with the propagation path of the sensing beam, such that, when the polarizing beamsplitter is illuminated by the sensing beam, the path of the first polarized sensing signal is deflected so that its deflected path is approximately perpendicular to the path of the second polarized sensing signal, the certain motions coupled to the polarizing beamsplitter through the casing have directions of movements which correspond to two orthogonal directions, the two directions corresponding to motions which are inline with the deflected path of the first polarized sensing signal and motions which are inline with the path of the second polarized sensing signal, and the selected motions coupled to the beamsplitter have directions of movement which correspond to motions which are inline with the path of the second polarized sensing signal; and the particular motions coupled to the first retroreflector have directions of movement which correspond to motions inline with the deflected path of the first polarized sensing signal, and the common mode signals contributed by the atmospheric effects are canceled in the receiver to provide the difference signal which represents the motions inline with the path of the second sensing signal.

28. The remote detector apparatus according to claim 27, wherein:

the first retroreflector is a corner-cube retroreflector; and the second retroreflector is a corner-cube retroreflector.

29. The remote detector apparatus according to claim 28, wherein the motions coupled to the casing are ground motions.

30. The remote detector apparatus according to claim 28, also including:

a top window on the casing;

wherein, the polarizing beamsplitter is also aligned with respect to the top window so that when the polarizing beamsplitter is illuminated through the top window by the sensing beam, the polarizing beamsplitter is functional to deflect the first polarized sensing signal in a horizontal-inline direction such that the deflected path of this signal is along a horizontal-inline ordinate and the path of the second polarized sensing signal is along a vertical ordinate, the certain motions coupled to the beamsplitter have directions of movements which correspond to motion inline with the horizontal and inline directions, and the selected motions coupled to the beamsplitter have directions of movement which correspond to motions inline with the vertical direction;

wherein, the particular motions coupled to the first retroreflector have directions of movement inline with horizontal-inline direction; and wherein, the second retroreflector is inertially isolated from motions having directions of movement inline with the vertical direction.

31. The remote detector apparatus according to claim 28, also including:

a side window on the casing;

wherein, the polarizing beamsplitter is also aligned with respect to the side window so that when the polarizing beamsplitter is illuminated through the side window by the sensing beam, the polarizing beamsplitter is functional to deflect the first polarized sensing signal in a vertical direction such that the deflected path of this signal is along a vertical ordinate and the path of the second polarized sensing signal is along a horizontal-inline ordinate, the certain motions coupled to the beamsplitter have directions of movements which correspond to motion inline with the vertical and horizontal-inline directions, and the selected motions coupled to the beamsplitter have directions of movement which correspond to motions inline with the horizontal-inline direction;

wherein, the particular motions coupled to the first retroreflector have directions of movement inline with the vertical direction; and wherein, the second retroreflector is inertially isolated from motions having directions of movement inline with the horizontal-inline direction.

32. A heterodyne remote sensing method for remotely obtaining a difference signal which is representative of selected motions at a selected location, comprising the steps of:

(a) producing a laser beam of substantially monochromatic frequency;

(b) splitting the laser beam into a sensing beam and a reference beam;

(c) changing the frequency of the reference beam to produce a frequency offset between the frequency of the sensing beam and the frequency of the reference beam;

(d) splitting the reference beam into two polarized reference signals, a first reference signal and a second reference signal, the polarity of the first reference signal being orthogonal to the polarity of the second reference signal;

(e) directing the sensing beam to the selected location;

(f) coupling motions at the selected location to a casing, the motions coupled to the casing having directions of movement in any of three orthogonal directions, said motions including the selected motions, the selected motions having directions of movement in one orthogonal direction;

(g) splitting the sensing beam at the casing to form two signals, and deflecting one of the signals;

(h) frequency modulating the deflected signal with the selected motions coupled to the casing so that it contains Doppler shifted frequency components that represent the selected motions coupled to the casing;

(i) polarizing the two signals such that the signals are transformed into polarized sensing signals having polarities which are transverse with respect to each other;

(j) combining the two polarized sensing signals, one of which contains the frequency components representing the selected motions, to form a return beam, the return beam having two, transversely polarized, return sensing signals which overlap each other on the return propagation path such that the two return sensing signals occupy substantially the same air space;

(k) detecting the return beam;

(l) separating the two polarized return signals from the return beam into two separated polarized signals, a first return signal and a second return signal, the polarity of the first return signal being orthogonal to the polarity of the second return signal and having the same polarity as the first reference signal;

(m) combining in an optical heterodyning process the first reference signal with the first return signal and the second reference signal with the second return signal to produce a first channel signal and a second channel signal, each channel signal having a center frequency approximately at the offset frequency;

(n) reversing the polarity of either channel signal;

(o) canceling common mode signals that were on the sensing beam and the return beam by combining the first channel signal and the second channel signal in a heterodyning process to produce a frequency modulated difference signal; and (p) demodulating the deference signal to produce a time varying signal which represents the selected motions coupled to the casing.

33. The method for obtaining a difference signal according to claim 32, wherein:
the motions coupled to the casing in step (f) are ground motions, and
the time varying signal of step (p) is a seismic trace.

34. The method of obtaining a difference signal according to claims 32, wherein:
step (h) also includes, frequency modulating both of the signals with common motions coupled to the casing, the common motions having directions of movement in an orthogonal direction other than the orthogonal direction of the selected motions, the signals being modulated by Doppler shifting each signal so that both said return sensing signals contain common frequency components representing the common motions coupled to the casing, the common frequency components being common mode signals to both said return sensing signals.

35. The method of obtaining a difference signal according to claim 32, wherein:
steps (g) and (i) occur at the same time, thereby, in splitting the sensing beam, a first polarized sensing signal and a second polarized sensing signal are formed, and the first polarized sensing signal is deflected to a path approximately perpendicular to the path of the second polarized sensing signal; and
wherein in step (h) the deflected first polarized sensing signal is frequency modulated with the selected motions coupled to the casing and step (h) also includes, (1) reflecting the polarized sensing signals within the casing such that they return to the location where they were separated into two signals in step (g), (2) deflecting the first polarized sensing signal to the same path as the return propagation path, and (3) again frequency modulating the twice deflected first polarized sensing signal with the selected motions coupled to the casing by Doppler shifting the signal, the Doppler shifted frequency components of the selected motions representing the cumulative selected motions of the casing.

36. A heterodyne remote sensing apparatus for remotely obtaining a difference signal which is representative of selected motions at a selected location, comprising:
a laser, the laser being functional for producing a laser beam of substantially monochromatic frequency;
a beamsplitter, the beamsplitter being functional for splitting the laser beam into a sensing beam and a reference beam;
a first Bragg cell, the Bragg cell being functional for changing the frequency of the reference beam to produce a frequency offset between the frequency of the sensing beam and the frequency of the reference beam;
a first polarizing beamsplitter, the first polarizing beamsplitter being functional for splitting the reference beam into two polarized reference signals, a first reference signal and a second reference signal, the polarity of the first reference signal being orthogonal to the polarity of the second reference signal;
a casing, the casing being functional to couple to motions at the selected location in any of three orthogonal directions, the motions coupled to the casing including the selected motions;
a means mounted on the casing which is functional for converting the sensing beam into a return beam having two overlapping transversely polarized return sensing signals with one of the return sensing signals having been frequency modulated to contain frequency components that represent the selected motions coupled to the casing, said means providing for (1) splitting the sensing beam into two signals, (2) deflecting one signal of the signals, (3) frequency modulating the deflected signal with the selected motions on the casing thereby Doppler shifting the deflected signal to contain Doppler shifted frequency components that represent the selected motions, (4) polarizing both of the signals such that the signals are transformed into polarized sensing signals having polarities which are transverse with respect to each other, (5) combining the polarized sensing signals, one of which contains the Doppler shifted frequency components representing the selected motions, into the return beam having overlapping transversely polarized return sensing signals, and (6) directing the return beam to a return propagation path which takes the return beam to a return beam detector, wherein the two overlapping transversely polarized return sensing signals of the return beam occupy substantially the same air space on the return propagation path;
the return beam detector, the return beam detector being functional for detecting the return beam;
a second polarizing beamsplitter, the second polarizing beamsplitter being functional for separating the two polarized return sensing signals from the return beam into two separated polarized signals, a first return signal and a second return signal, the polarity of the first return signal being orthogonal to the polarity of the second return signal and having the same polarity as the first reference signal;

a first photodetector, the first photodetector being functional for combining in an optical heterodyning process the first reference signal with the first return signal to produce a first channel signal having a center frequency approximately at the frequency offset;

a second photodetector, the second photodetector being functional for combining in an optical heterodyning process the second reference signal with the second return signal to produce a second channel signal having a center frequency approximately at the frequency offset, the first channel signal and the second channel signal being two channel signals;

an oscillator, the oscillator being functional to produce a signal having a frequency which when heterodyned with one of the two channel signals reverses the polarity of the channel signal and shifts the channel signal frequency;

a means for combining the oscillator signal with said one of the two channel signals to produce a polarity reversed channel signal; and a means for combining the polarity reversed channel signal with a remaining channel signal of the two channel signals in a heterodyning process to cancel any common mode signals that were on the two polarized return sensing signals, the means for combining also producing a frequency modulated difference signal which represents the selected motions.

37. The apparatus for remotely obtaining a difference signal of claim 36, wherein the selected motions represented by the frequency modulated difference signal are vertical motions.

38. The apparatus for remotely obtaining a difference signal of claim 36, wherein the selected motions represented by the frequency modulated difference signal are horizontal-crossline motions.

39. The apparatus for remotely obtaining a difference signal of claim 36, wherein the selected motions represented by the frequency modulated difference signal are horizontal-inline motions.

40. The apparatus for remotely obtaining a difference signal of claim 36 also including a second Bragg cell, the first and second Bragg cells being cascaded Bragg cells, the cascaded Bragg cells being functional to decrease the effects of a contaminating signal produced by a leakage of the reference beam frequency through the first Bragg cell and to produce a frequency offset between the reference beam and the sensing beam.

41. The apparatus for remotely obtaining a difference signal of claim 36, also including, an FM demodulator to produce an time varying signal which represents the selected motions coupled to the casing at the selected location.

42. The apparatus for remotely obtaining a difference signal of claim 41, wherein:
the motions coupled to the casing are ground motions; and
the time varying signal is a seismic trace.

43. A heterodyne remote sensing method for remotely obtaining a difference signal which is representative of selected motions at a selected location, comprising the steps of:
(a) producing a laser beam of substantially monochromatic frequency;

(b) directing the sensing beam to the selected location;

(c) coupling motions at the selected location to a casing, the motions coupled to the casing having directions of movement in any of three orthogonal directions, said motions including the selected motions, the selected motions having directions of movement in one orthogonal direction;

(d) splitting the sensing beam at the casing to form two signals, and deflecting one of the signals;

(e) frequency modulating the deflected signal with the selected motions coupled to the casing so that it contains Doppler shifted frequency components that represent the selected motions coupled to the casing;

(f) polarizing the two signals such that the signals are transformed into polarized sensing signals having polarities which are transverse with respect to each other;

(g) combining the two polarized sensing signals, one of which contains the frequency components representing the selected motions, to form a return beam, the return beam having two, transversely polarized, return sensing signals which overlap each other on the return propagation path such that the two return sensing signals occupy substantially the same air space;

(h) detecting the return beam;

(i) separating the two polarized return signals from the return beam into two separated polarized signals, a first return signal and a second return signal, the polarity of the first return signal being orthogonal to the polarity of the second return signal and having the same polarity as the first reference signal;

(j) changing the frequency of the first return signal to produce a frequency offset between the frequency of the first return signal and the frequency of the second return signal;

(k) reversing the polarity of the second return signal;

(l) canceling common mode signals on the sensing beam and the return beam by combining in an optical heterodyning process the first return signal with the second return signal to produce a channel signal, the optical heterodyning producing a frequency modulated difference signal which represents the selected motions; and (m) demodulating the deference signal to produce a time varying signal which represents the selected motions coupled to the casing.

44. The method for obtaining a difference signal according to claim 43, wherein:
the motions coupled to the casing in step (c) are ground motions, and
the amplitude modulated signal of step (m) is a seismic trace.

45. The method of obtaining a difference signal according to claim 43, wherein:
step (e) also includes, frequency modulating both of the signals with common motions coupled to the casing, the common motions having directions of movement in an orthogonal direction other than the orthogonal direction of the selected motions, the signals being modulated by Doppler shifting each signal so that both said return sensing signals contain common frequency components representing the common motions coupled to the casing, the common frequency components being common mode signals to both said return sensing signals.

46. The method of obtaining a difference signal according to claim 43, wherein:
steps (d) and (f) occur at the same time, thereby, in splitting the sensing beam, a first polarized sensing signal and a second polarized sensing signal are formed, and the first polarized sensing signal is deflected to a path approximately perpendicular to the path of the second polarized sensing signal; and wherein in step (e) the deflected first polarized sensing signal is frequency modulated with the selected motions coupled to the casing and step (e) also includes, (1) reflecting the polarized sensing signals within the casing such that they return to the location where they were separated into two signals in step (d) (2) deflecting the first polarized sensing signal to the same path as the return propagation path, and (3) again frequency modulating the twice deflected first polarized sensing signal with the selected motions coupled to the casing by Doppler shifting the signal, the Doppler shifted frequency components of the selected motions representing the cumulative selected motions of the casing.

47. A heterodyne remote sensing apparatus for remotely obtaining a difference signal which is representative of selected motions at a selected location, comprising:
a laser, the laser being functional for producing a laser beam of substantially monochromatic frequency;
a casing, the casing being functional to couple to motions at the selected location in any of three orthogonal directions, the motions coupled to the casing including the selected motions;
a means mounted on the casing which is functional for converting the sensing beam into a return beam having two overlapping transversely polarized return sensing signals with one of the return sensing signals having been frequency modulated to contain frequency components that represent the selected motions coupled to the casing, said means providing for (1) splitting the sensing beam into two signals, (2) deflecting one signal of the signals, (3) frequency modulating the deflected signal with the selected motions on the casing thereby Doppler shifting the deflected signal to contain Doppler shifted frequency components that represent the selected motions, (4) polarizing both of the signals such that the signals are transformed into polarized sensing signals having polarities which are transverse with respect to each other, (5) combining the polarized sensing signals, one of which contains the Doppler shifted frequency components representing the selected motions, into the return beam having overlapping transversely polarized return sensing signals, and (6) directing the return beam to a return propagation path which takes the return beam to a return beam detector, wherein the two overlapping transversely polarized return sensing signals of the return beam occupy substantially the same air space on the return propagation path;
the return beam detector, the return beam detector being functional for detecting the return beam;
a polarizing beamsplitter, the polarizing beamsplitter being functional for separating the two polarized return signals from the return beam into two separated polarized signals, a first return signal and a second return signal, the polarity of the first return signal being orthogonal to the polarity of the second return signal and having the same polarity as the first reference signal;
a means for changing the frequency of the first return signal to produce a frequency offset between the frequency of the first return signal and the second return signal;
a means for rotating the polarity of the second return signal such that it has the same polarity as the first return signal; and
a photodetector, the photodetector being functional for combining in an optical heterodyning process the first return signal with the second return signal to cancel common mode signals which were on the sensing beam and the return beam and to produce a channel signal having a center frequency approximately at the frequency offset, the channel signal being the frequency modulated difference signal which represents the selected motions at the selected location.

48. The apparatus for remotely obtaining a difference signal of claim 47, wherein the selected motions represented by the frequency modulated difference signal are vertical motions.

49. The apparatus for remotely obtaining a difference signal of claim 47, wherein the selected motions represented by the frequency modulated difference signal are horizontal-crossline motions.

50. The apparatus for remotely obtaining a difference signal of claim 47, wherein the selected motions represented by the frequency modulated difference signal are horizontal-inline motions.

51. The apparatus for remotely obtaining a difference signal of claim 47, wherein the means for changing the frequency of the first return signal is a Bragg cell.

52. The apparatus for remotely obtaining a difference signal of claim 47, wherein the means for reversing the polarity of the second return signal is a quarter-wave plate.

53. The apparatus for remotely obtaining a difference signal of claim 47, wherein:
the motions coupled to the casing are ground motions; and
the time varying signal is a seismic trace.

54. A method for producing a single return beam having two transversely polarized, overlapping, return sensing signals, the return sensing signals having a difference signal between them which represents selected motions at a selected location, said return beam being used with a bipolarized, differential mode, laser differential interferometry, remote sensing system, to detect the selected motions, said overlapping signals enabling the remote sensing system to reduce turbulent noise on the difference signal, the turbulent noise being caused by atmospheric effects between a receiver of the remote sensing system and the selected location, the method comprising the steps of:
(a) transmitting a single sensing beam having a substantially monochromatic frequency to the selected location;
(b) coupling motions at the remote location to a casing, the motions being in any of three orthogonal directions, the motions including the selected motions;
(c) separating two signals from the sensing beam;
(d) deflecting one signal of the signals;

(e) frequency modulating the deflected signal with the selected motions coupled to the casing by Doppler shifting the deflected signal to contain Doppler shifted frequency components that represent the selected motions;

(f) polarizing both of the signals such that the signals are transformed into polarized sensing signals having polarities which are transverse with respect to each other; and (g) combining the polarized sensing signals, one of which contains the Doppler shifted frequency components representing the selected motions, into the return beam having a return propagation path to the receiver of the sensing system, the two transversely polarized return sensing signals being combined into the return beam so that they overlap each other on the return propagation path such that the two return sensing signals occupy substantially the same airspace.

55. The method according to claim 54, wherein:

step (c) also includes, separating the sensing beam into a first signal and a second signal;

step (d) also includes, deflecting the first signal to a deflected path that is approximately perpendicular to the path of the second signal; and step (g) also includes (1) reflecting the polarized sensing signals within the casing such that they return to the location where the signals were separated in step (c), (2) deflecting the polarized sensing signal obtained from the deflected signal to the same path as the return propagation path, and (3) frequency modulating the deflected polarized signal with the deflected polarized signal, whereby the Doppler shifted frequency components on the deflected polarized sensing signal represent the casing's cumulative selected motions at the selected location.

56. The method according to claim 54, wherein:

steps (c) and (f) occur simultaneously to separate the sensing signal into a first polarized sensing signal and a second sensing polarized sensing signal;

step (d) also includes, deflecting the first polarized sensing signal to a deflected path that is approximately perpendicular to the path of the second polarized sensing signal; and step (g) also includes (1) reflecting the polarized sensing signals within the casing such that they return to the location where the polarized sensing signals were separated in step (c), (2) deflecting the first polarized sensing signal to the same path as the return propagation path, and (3) again frequency modulating the twice deflected first polarized signal with the selected motions coupled to the casing by Doppler shifting the signal, whereby the Doppler shifted frequency components on the first polarized sensing signal represent the casing's cumulative selected motions at the selected location.

* * * * *